(12) United States Patent
Luechinger et al.

(10) Patent No.: US 8,308,050 B1
(45) Date of Patent: *Nov. 13, 2012

(54) SOLAR SUBSTRATE RIBBON BONDING SYSTEM

(75) Inventors: Christoph Benno Luechinger, Irvine, CA (US); Orlando Luis Valentin, Rancho Santa Margarita, CA (US)

(73) Assignee: Orthodyne Electronics Corporaition, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,823

(22) Filed: Jul. 2, 2012

Related U.S. Application Data

(63) Continuation of application No. 13/251,741, filed on Oct. 3, 2011, now Pat. No. 8,231,044.

(60) Provisional application No. 61/389,022, filed on Oct. 1, 2010.

(51) Int. Cl.
*B23K 1/06* (2006.01)

(52) U.S. Cl. .................. 228/110.1; 228/180.5

(58) Field of Classification Search .......... None
See application file for complete search history.

(56) References Cited

U.S. PATENT DOCUMENTS

| | | | |
|---|---|---|---|
| 4,041,271 A | 8/1977 | Lorans | |
| 4,231,505 A | 11/1980 | Shaw et al. | |
| 4,306,674 A | 12/1981 | Charles et al. | |
| 4,534,502 A | 8/1985 | Piurek | |
| 4,591,087 A | 5/1986 | Frasch | |
| 4,617,722 A | 10/1986 | Willis | |
| 4,838,472 A | 6/1989 | Scavino | |
| 4,975,133 A | 12/1990 | Gochermann | |
| 5,151,377 A | 9/1992 | Hanoka et al. | |
| 5,411,897 A | 5/1995 | Harvey et al. | |
| 5,699,951 A | 12/1997 | Miyoshi | |
| 5,735,449 A | 4/1998 | Magni | |
| 5,894,983 A | 4/1999 | Beck et al. | |
| 5,948,175 A | 9/1999 | Glenn | |
| 5,961,737 A | 10/1999 | Glenn | |
| 6,269,999 B1 | 8/2001 | Okazaki et al. | |
| 6,357,649 B1 | 3/2002 | Okatsu et al. | |
| 7,595,582 B2 | 9/2009 | Ozaki et al. | |
| 7,745,253 B2 | 6/2010 | Luechinger | |
| 7,828,031 B2 | 11/2010 | Micciche | |
| 2002/0063144 A1 | 5/2002 | Yamaguchi et al. | |
| 2003/0160084 A1 | 8/2003 | Higashiyama | |
| 2004/0219801 A1 | 11/2004 | Oswald et al. | |
| 2006/0065695 A1 | 3/2006 | Laurent | |
| 2006/0278682 A1 | 12/2006 | Lange et al. | |
| 2008/0053511 A1 | 3/2008 | Nakamura | |
| 2008/0061111 A1 | 3/2008 | Kiriyama | |
| 2009/0236328 A1 | 9/2009 | Dingle et al. | |
| 2010/0037932 A1 | 2/2010 | Erez et al. | |

(Continued)

FOREIGN PATENT DOCUMENTS

DE 102009044060 A1 3/2011

(Continued)

*Primary Examiner* — Kiley Stoner

(74) *Attorney, Agent, or Firm* — Christopher M. Spletzer, Sr.

(57) ABSTRACT

An ultrasonic solar substrate bonding system is provided. The system includes a bond head assembly including a bonding tool for bonding a ribbon material to a plurality of solar substrates. The system also includes a ribbon feeding system successively supplying portions of a continuous length of the ribbon material to the bonding tool such that the bonding tool forms ultrasonic bonds between the portions of the continuous length of the ribbon material and a plurality of solar substrates.

29 Claims, 35 Drawing Sheets

U.S. PATENT DOCUMENTS

| | | | |
|---|---|---|---|
| 2010/0038358 A1 | 2/2010 | Dingle et al. | |
| 2010/0058582 A1 | 3/2010 | Hofmann et al. | |
| 2010/0282288 A1 | 11/2010 | Cornfeld | |
| 2011/0147437 A1 | 6/2011 | Eusch et al. | |
| 2011/0314672 A1 | 12/2011 | Lu et al. | |
| 2012/0006483 A1 | 1/2012 | Hanoka et al. | |

FOREIGN PATENT DOCUMENTS

| | | |
|---|---|---|
| JP | 54-128270 A | 10/1979 |
| JP | 60-60775 | 4/1985 |
| JP | 60-154535 A | 8/1985 |
| JP | 10-163276 | 6/1998 |
| JP | 10-321654 | 12/1998 |
| JP | 2000-232187 | 8/2000 |
| JP | 2001-111085 A | 4/2001 |
| WO | WO03/012883 A2 | 2/2003 |
| WO | WO2008/152678 A1 | 12/2008 |
| WO | W02009/097588 A2 | 8/2009 |
| WO | WO2009/149211 A2 | 12/2009 |
| WO | WO2010/091680 A2 | 8/2010 |
| WO | WO2010/128021 A2 | 11/2010 |
| WO | WO2011/123539 | 10/2011 |
| WO | WO2011/137269 A2 | 11/2011 |
| WO | WO2012/012335 | 1/2012 |

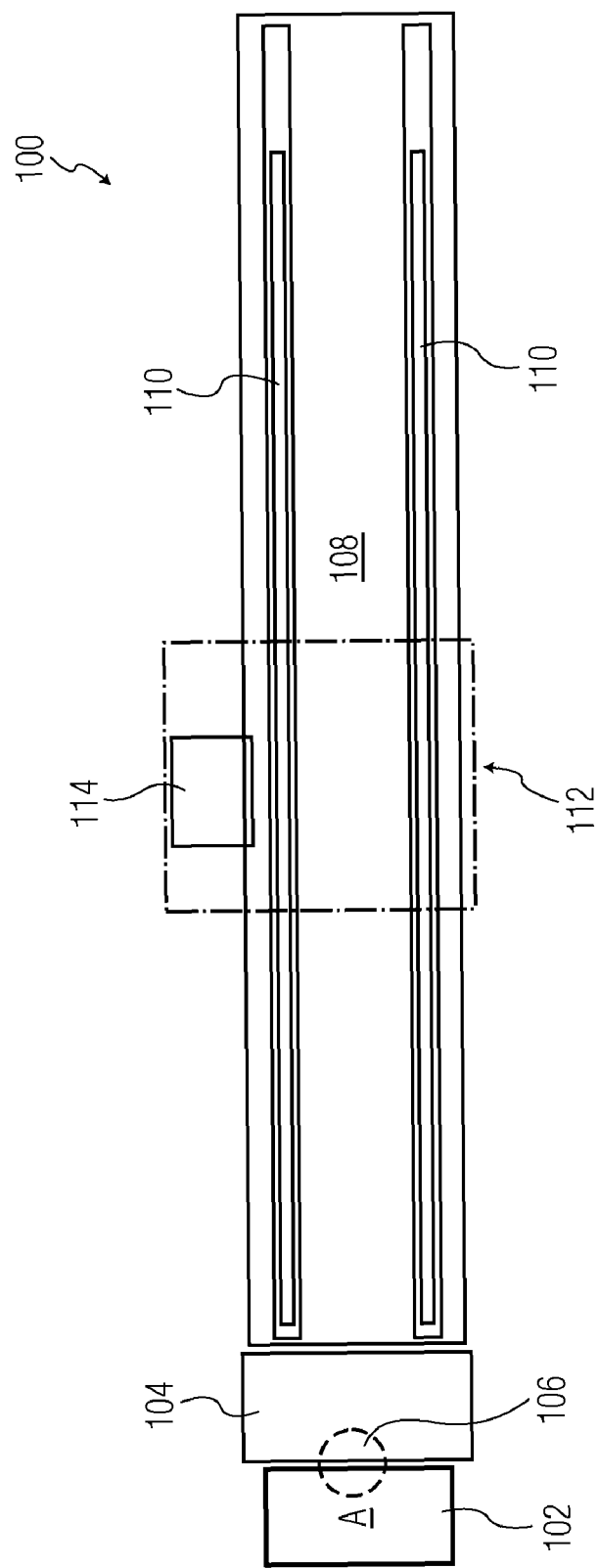

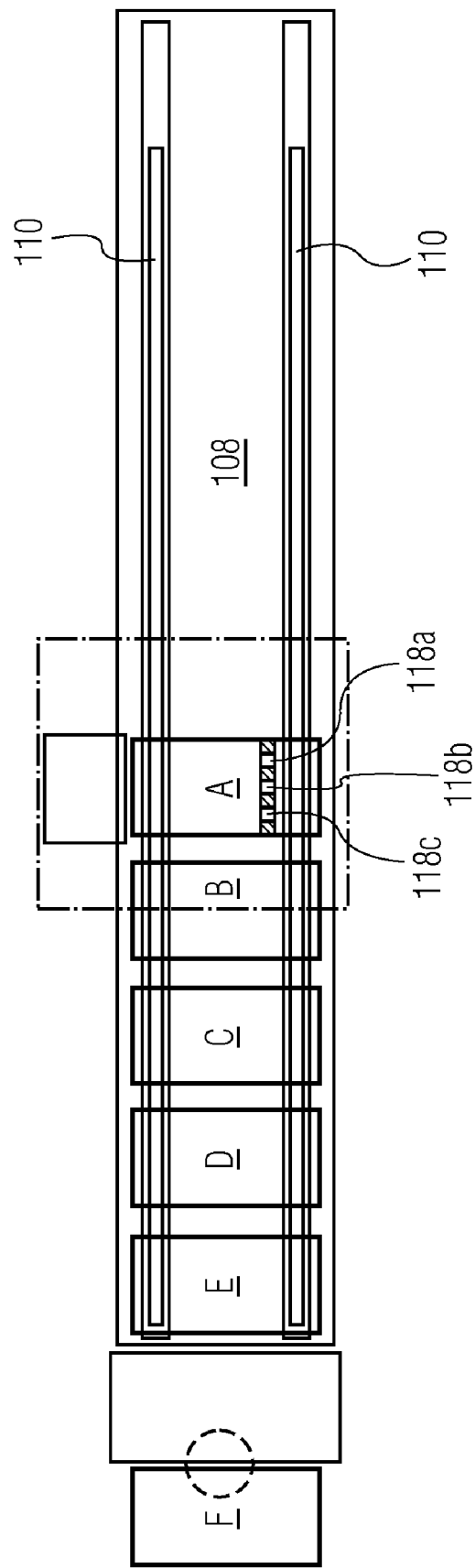

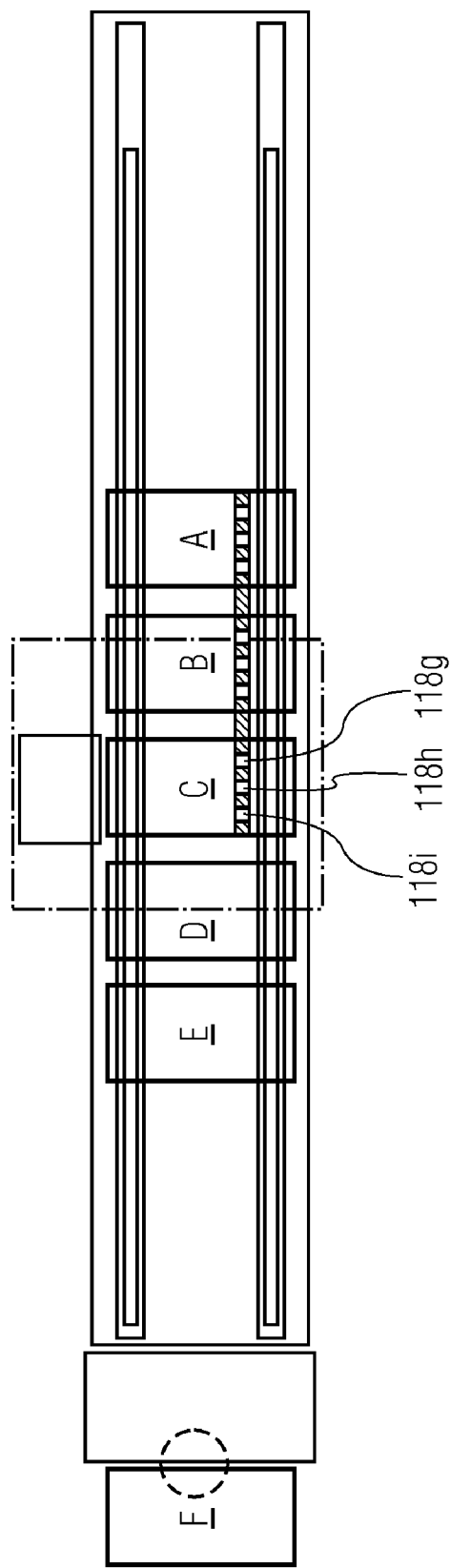

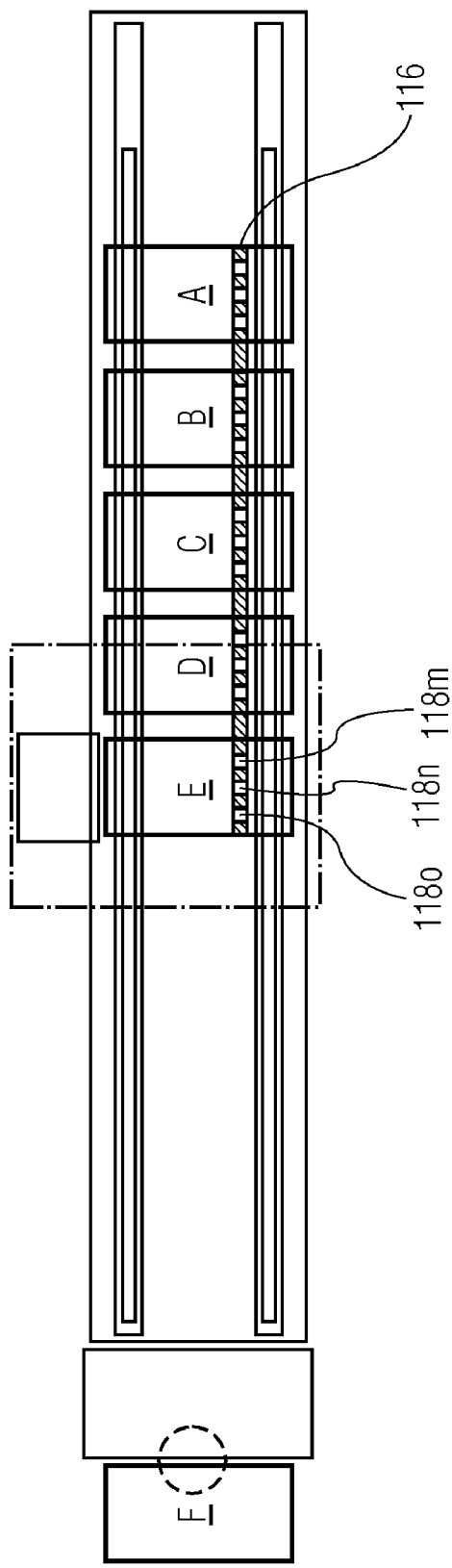

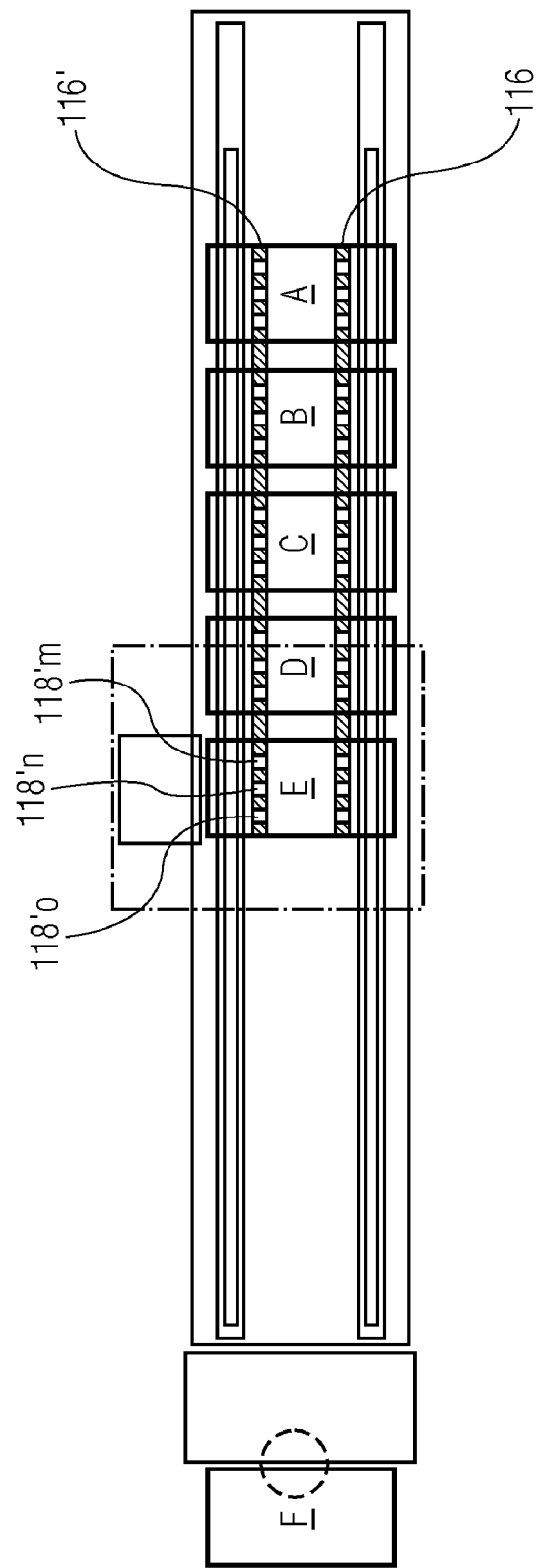

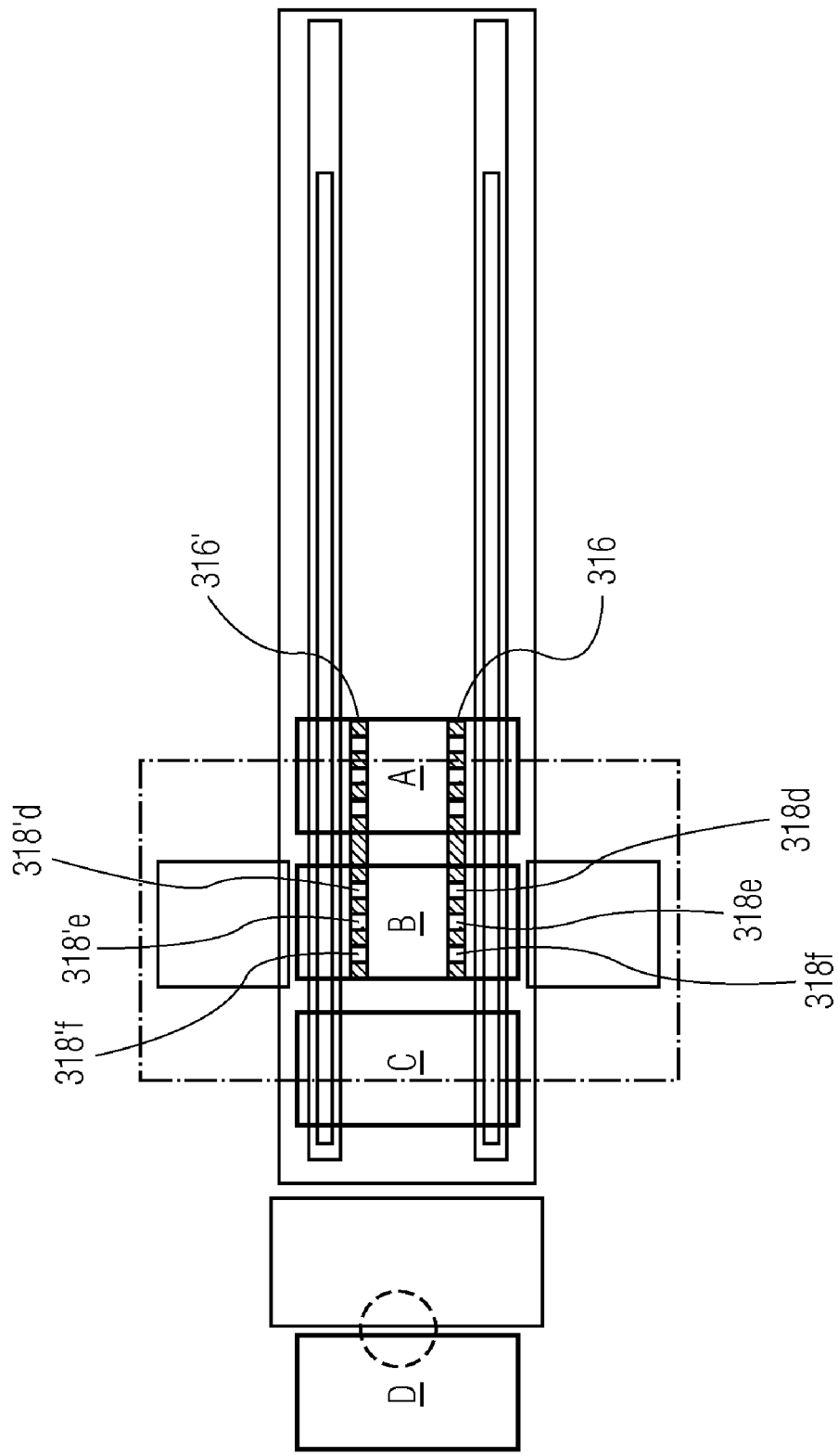

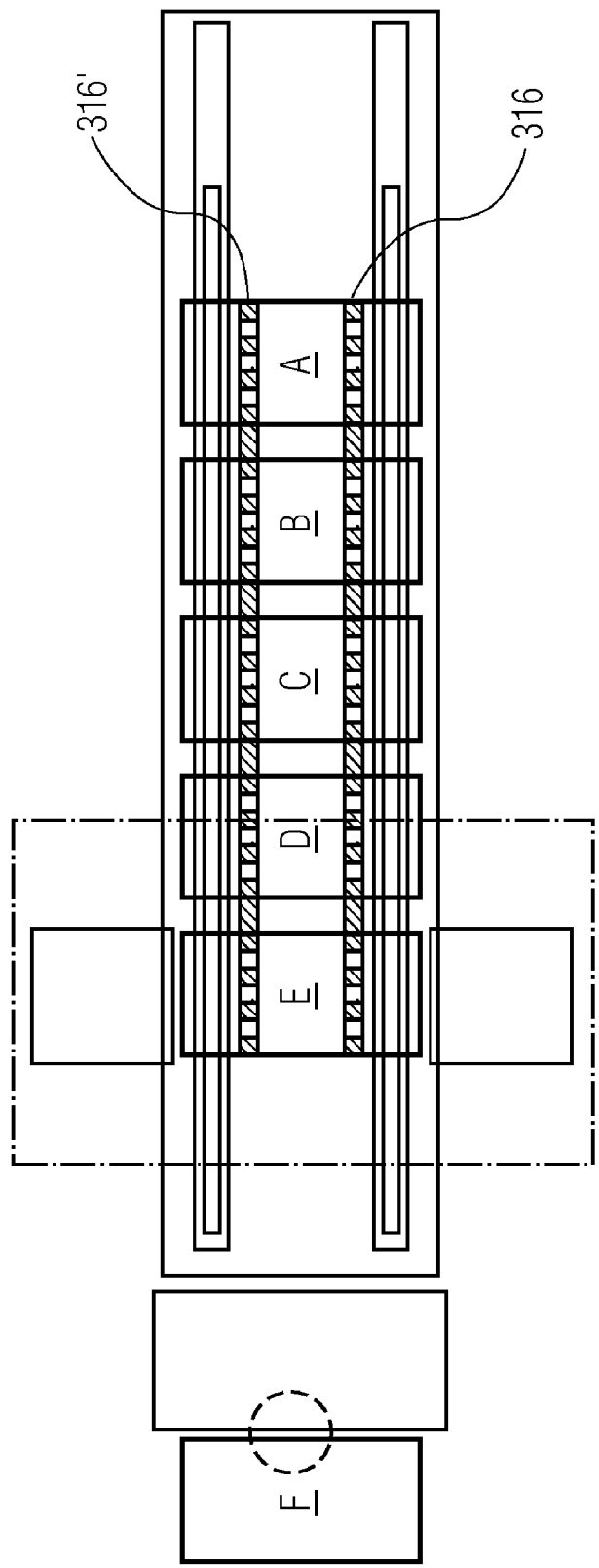

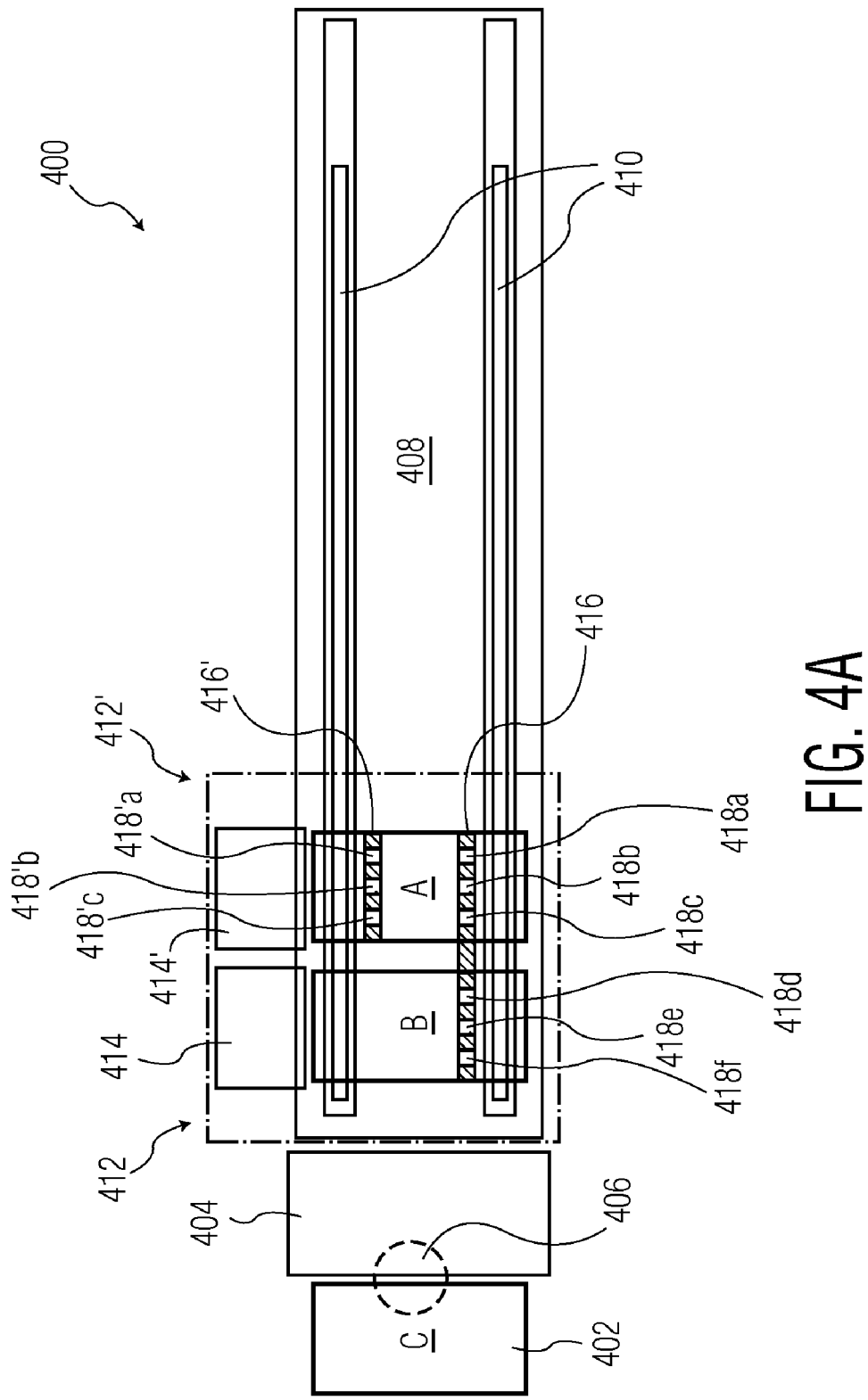

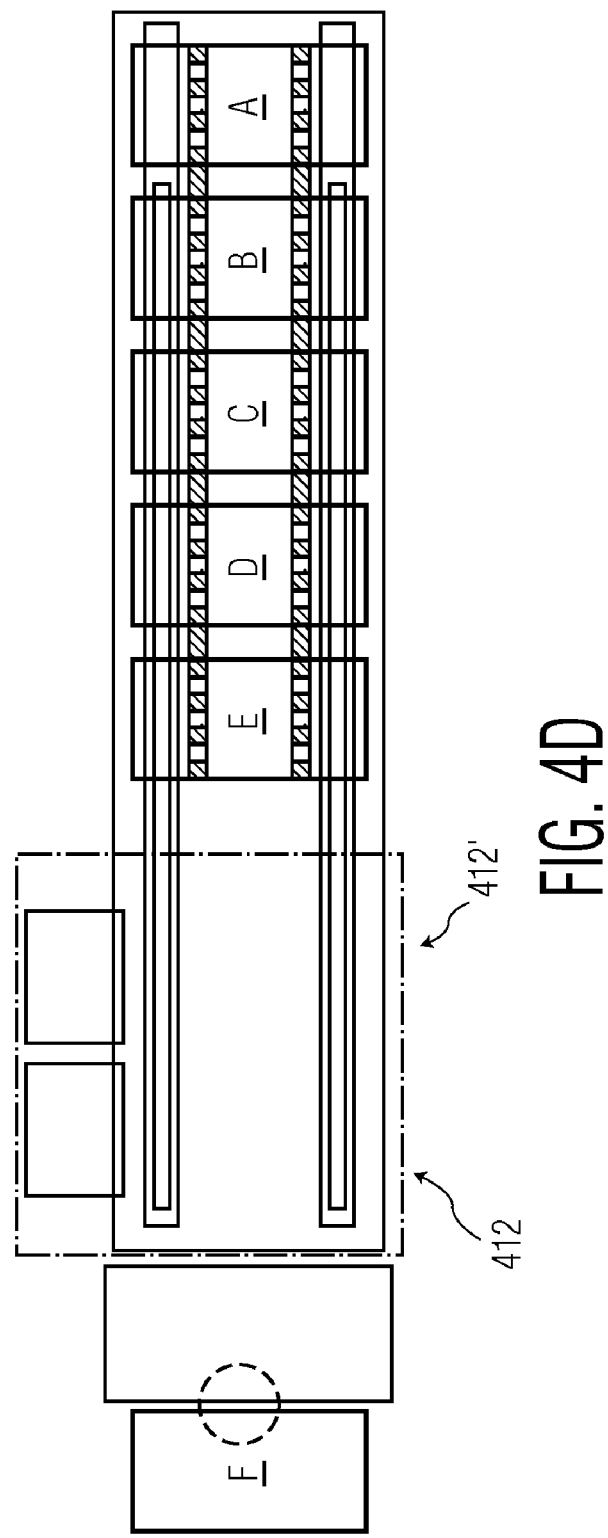

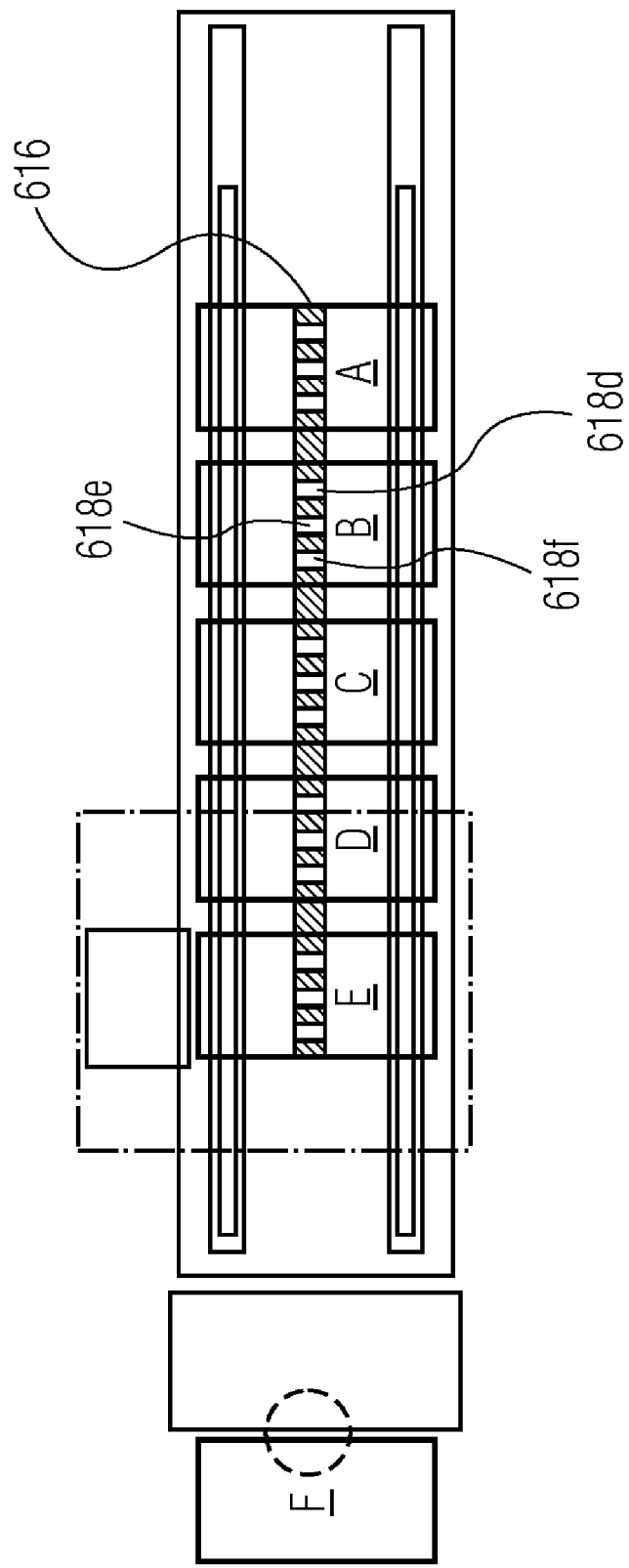

SOLAR SUBSTRATE RIBBON BONDING SYSTEM

CROSS-REFERENCE TO RELATED APPLICATION

This application is a continuation of U.S. patent application Ser. No. 13/251,741 filed Oct. 3, 2011, which claims the benefit of U.S. Provisional Application No. 61/389,022, filed Oct. 1, 2010, the contents of both of which are incorporated herein by reference.

FIELD OF THE INVENTION

The present invention relates to ultrasonic bonding operations, and more particularly, to ultrasonic ribbon bonding systems for solar cells and the like.

BACKGROUND OF THE INVENTION

In the processing and packaging of semiconductor devices, ultrasonic bonding (e.g., wire bonding, ribbon bonding, etc.) continues to be a widely used method of providing electrical interconnection between two locations within a package (e.g., between a bond pad of a semiconductor die and a lead of a leadframe). For example, ribbon bonding machines are used to form ribbon interconnections between respective locations to be electrically interconnected. The upper terminal end of a bonding tool is, in many instances, configured to be engaged in a transducer (e.g., an ultrasonic transducer) of a ribbon bonding system which causes the bonding tool to vibrate upon bonding. Ultrasonic bonding is a joining process that, for example, may use relative motion between the ribbon and the surface it is bonded to. It is this relative motion that enables the bond formation.

In providing interconnection in solar cell applications (e.g., crystalline silicon solar cells, thin film solar cells, etc.), techniques such as soldering or conductive adhesive bonding have been used to electrically connect adjacent cells, to collect electricity from multiple cells, etc.

SUMMARY OF THE INVENTION

According to an exemplary embodiment of the present invention, an ultrasonic solar substrate bonding system is provided. The system includes a bond head assembly including a bonding tool for bonding a ribbon material to a plurality of solar substrates. The system also includes a ribbon feeding system successively supplying portions of a continuous length of the ribbon material to the bonding tool such that the bonding tool forms ultrasonic bonds between the portions of the continuous length of the ribbon material and a plurality of solar substrates.

According to another exemplary embodiment of the present invention, a method of providing electrical interconnection between solar substrates is provided. The method includes the steps of: (1) providing a bond head assembly including a bonding tool; (2) ultrasonically bonding a portion of a ribbon material to a bonding location of a first solar substrate with the bonding tool to form a first bonded portion; (3) extending a length of the ribbon material continuous with the first bonded portion to a second solar substrate; and (4) ultrasonically bonding another portion of the ribbon material, continuous with the length of the ribbon material, to a bonding location of the second solar substrate with the bonding tool to form a second bonded portion.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 1 is a plan overhead block diagram view of an ultrasonic solar substrate bonding system in accordance with an exemplary embodiment of the present invention;

FIGS. 2A-2L are a series of plan overhead block diagram views of the ultrasonic solar substrate bonding system of FIG. 1, illustrating a sequential ribbon bonding operation in accordance with an exemplary embodiment of the present invention;

FIGS. 3A-3D are a series of plan overhead block diagram views of another ultrasonic solar substrate bonding system illustrating a sequential ribbon bonding operation in accordance with another exemplary embodiment of the present invention;

FIGS. 4A-4D are a series of plan overhead block diagram views of yet another ultrasonic solar substrate bonding system illustrating a sequential ribbon bonding operation in accordance with yet another exemplary embodiment of the present invention;

FIGS. 6A-6C are a series of plan overhead block diagram views of yet another ultrasonic solar substrate bonding system illustrating a sequential ribbon bonding operation in accordance with yet another exemplary embodiment of the present invention;

DETAILED DESCRIPTION OF THE INVENTION

Figure 2A:
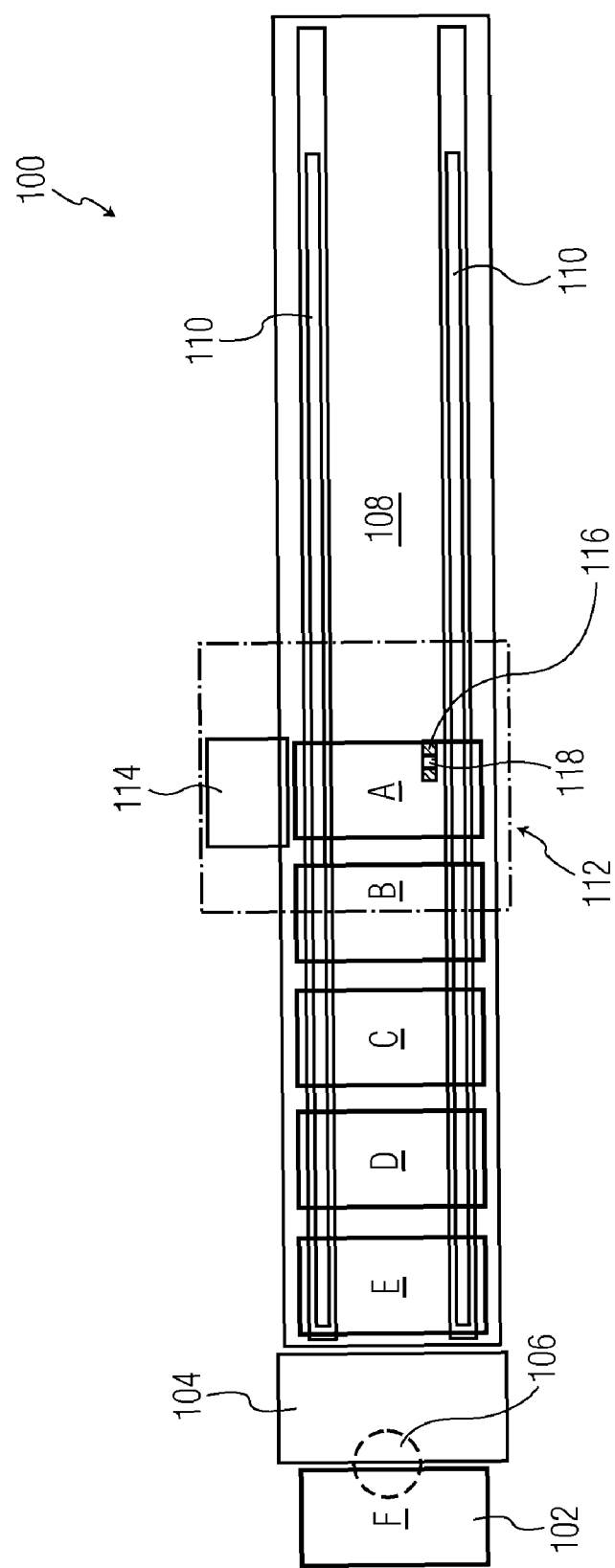

FIG. 1 illustrates ultrasonic ribbon bonding system 100 (e.g., an ultrasonic solar substrate bonding system) for bonding conductive ribbon material (not shown) between solar substrates (with only one solar substrate "A" visible in FIG. 1) (e.g., crystalline solar cells, thin film solar cells, etc.). Ultrasonic bonding system 100 includes input stack 102 of solar substrates, with first solar substrate "A" shown on the top of input stack 102. To the right of input stack 102 is alignment unit 104 (e.g., a centering unit) which includes camera 106 (e.g., a look-up camera as shown, a downward looking camera, etc.). Alignment unit 104 may include a material handling system for supporting and transporting ones of a plurality of solar substrates. Material handling components are known to those skilled in the art and include gripping mechanisms, pushing mechanisms, pulling mechanisms, lifting mechanisms, flipping mechanisms, etc. (none shown), as is desired in the given application, and may be configured to position ones of the plurality of solar substrates in a predetermined position prior to bonding by the bonding tool. Camera 106 may be configured for imaging ones of the plurality of solar substrates prior to bonding by the bonding tool, where such images may be used by alignment unit 104 in positioning ones of the plurality of solar substrates in a predetermined position.

Ultrasonic bonding system 100 also includes indexing system 108 (also known as a material handling system) for holding and moving a plurality of solar substrates "A", "B", "C", etc. In the illustrated example, the material handling system comprises walking beam structure 110 configured to move ones of the plurality of solar substrates with respect to a bond head assembly, and a workholder structure configured to support ones of the plurality of solar substrates during a ribbon bonding operation (e.g., see FIGS. 7 and 8a). In the illustrated example, indexing system 108 includes string walking beam 110 (the operation of which is described below); however, other types of indexing systems are contemplated. The material handling system may be configured to: (1) support ones of the plurality of solar substrates upstream of the bond head assembly; (2) position ones of the plurality of solar substrates under the bond head assembly for bonding by the bond head assembly; and (3) support bonded ones of the plurality of solar substrates downstream of the bond head assembly.

Ribbon bonder 112 is provided along the length of indexing system 108. Ribbon bonder 112 includes XY table 114 for carrying a bond head assembly. The bond head assembly (not shown in FIG. 1) includes elements desired in the given application such as a transducer, a ribbon bonding tool, etc. The operation of the exemplary system shown in FIG. 1 is now described in connection with FIGS. 2A-2L.

FIG. 2A illustrates solar substrates "A"-"E" that have been moved from input stack 102 to indexing system 108 (using alignment unit 104), with another solar substrate "F" on the top of input stack 102. In this example, it is desired to electrically interconnect each of substrates "A"-"E". In FIG. 2A, solar substrate "A" is being bonded by ribbon bonder 112 after substrate "A" has been placed in a bonding position on ribbon bonder 112. That is, ribbon material 116 is being continuously fed from a ribbon feeding system (not shown) that is carried by XY table 114, and is being bonded to solar substrate "A". For example, ribbon material 116 may be bonded to the bottom of solar substrate "A" to, for example, allow the active solar material on the top of solar substrate "A" to be free of ribbon material 116 which would tend to block absorption of solar energy by the solar substrate's active material. Of course, the teachings of the present invention may also be applied to bonding ribbon material 116 to a portion (e.g., a conductive busbar or the like) on the top side of solar substrate "A" (or both the top and bottom of substrates).

Figure 2B:
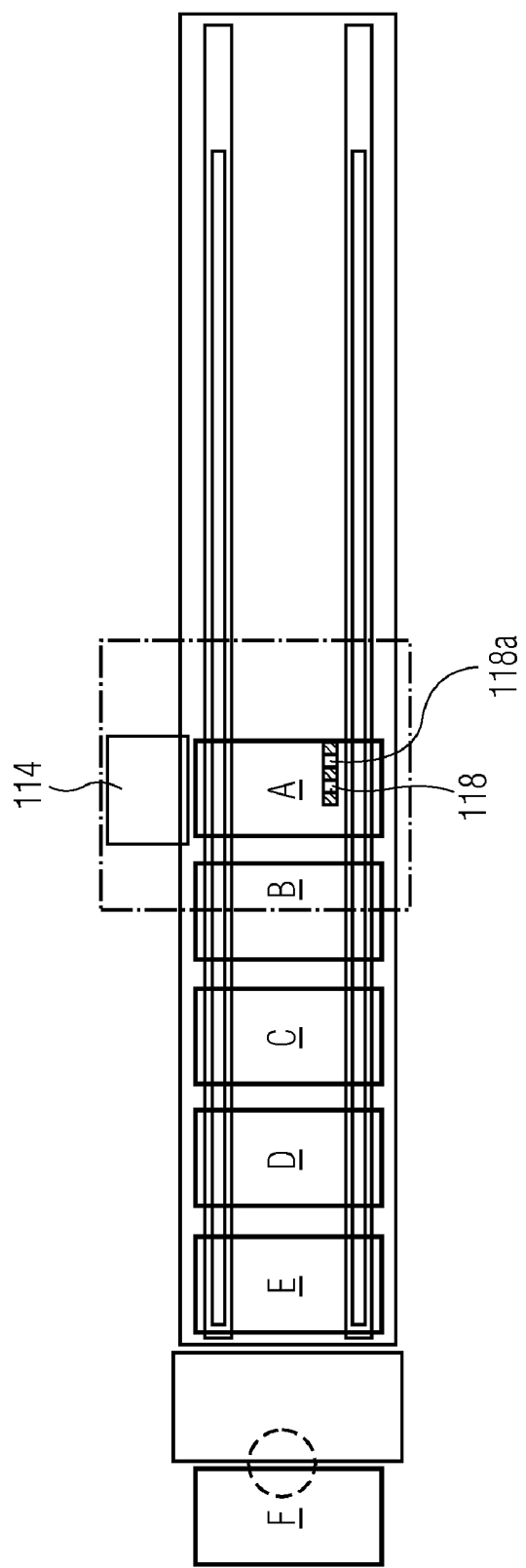
Figure 2D:
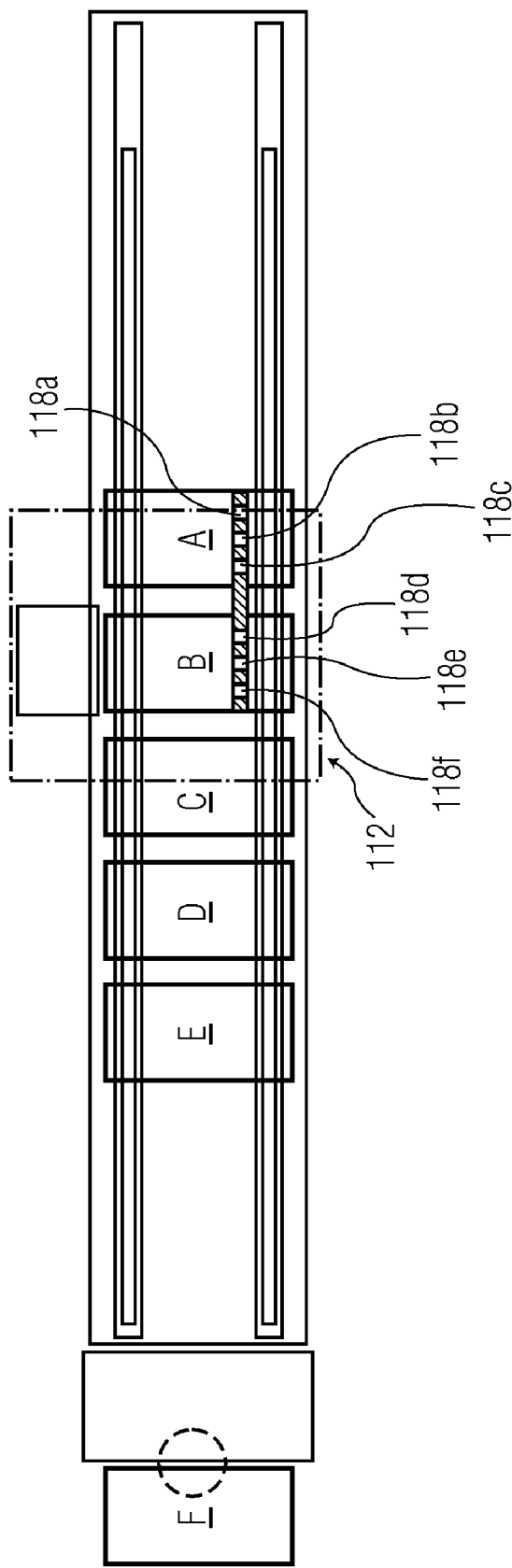
Figure 2F:
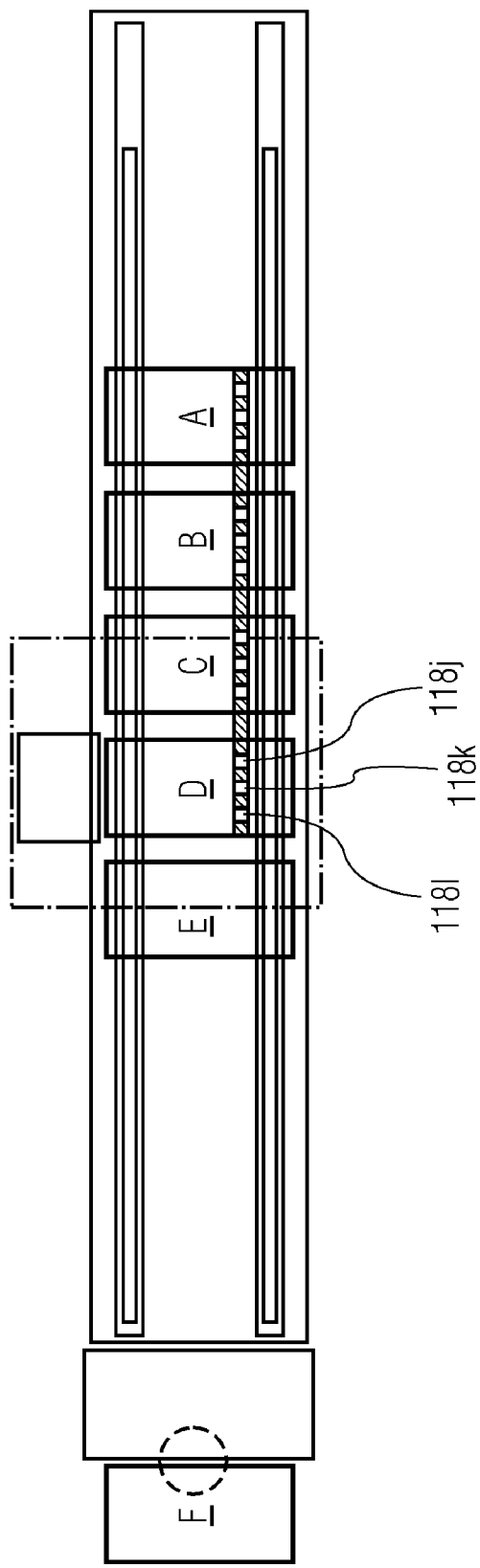

FIG. 2A illustrates 'lower' portion 118 of ribbon material 116 being bonded (actively being bonded) to substrate "A" (e.g., using a ribbon bonding tool, not shown in FIG. 2A). In FIG. 2B, another portion 118 is being bonded, while the portion 118 that was being bonded in FIG. 2A is now bonded portion 118a. For example, XY table 114 has moved between FIG. 2A and FIG. 2B so that another portion 118 may be bonded in FIG. 2B. In FIG. 2C, three bonded portions 118a, 118b, 118c have now been completed (but could be any number of bonded portions) on solar substrate "A", and now it is time to continue bonding the ribbon material (e.g., in a continuous length) to next solar substrate "B". Indexing system 108 (e.g., string walking beam 110) is used to move solar substrates "A"-"E" so that solar substrate "B" is positioned in the bonding position on ribbon bonder 112 (i.e., the position shown in FIG. 2D). FIG. 2D also illustrates three bonded portions 118d, 118e, 118f having been formed on solar substrate "B". The process of indexing and bonding solar substrates "C", "D", "E" continues, and FIG. 2E illustrates three bonded portions 118g, 118h, 118i on solar substrate "C", FIG. 2F illustrates three bonded portions 118j, 118k, 118l on solar substrate "D", and FIG. 2G illustrates three bonded portions 118m, 118n, 1180 on solar substrate "E". At this point (at FIG. 2G) a continuous length of ribbon material 116 has been bonded across string of solar substrates "A"-"E" (e.g., where the string includes five solar substrates "A", "B", "C", "D", "E" in this example, but may include any number of substrates), and bonded length of ribbon material 116 is separated from a ribbon supply (e.g., using a cutter, etc.—not shown) past bonded portion 1180.

Figure 2H:
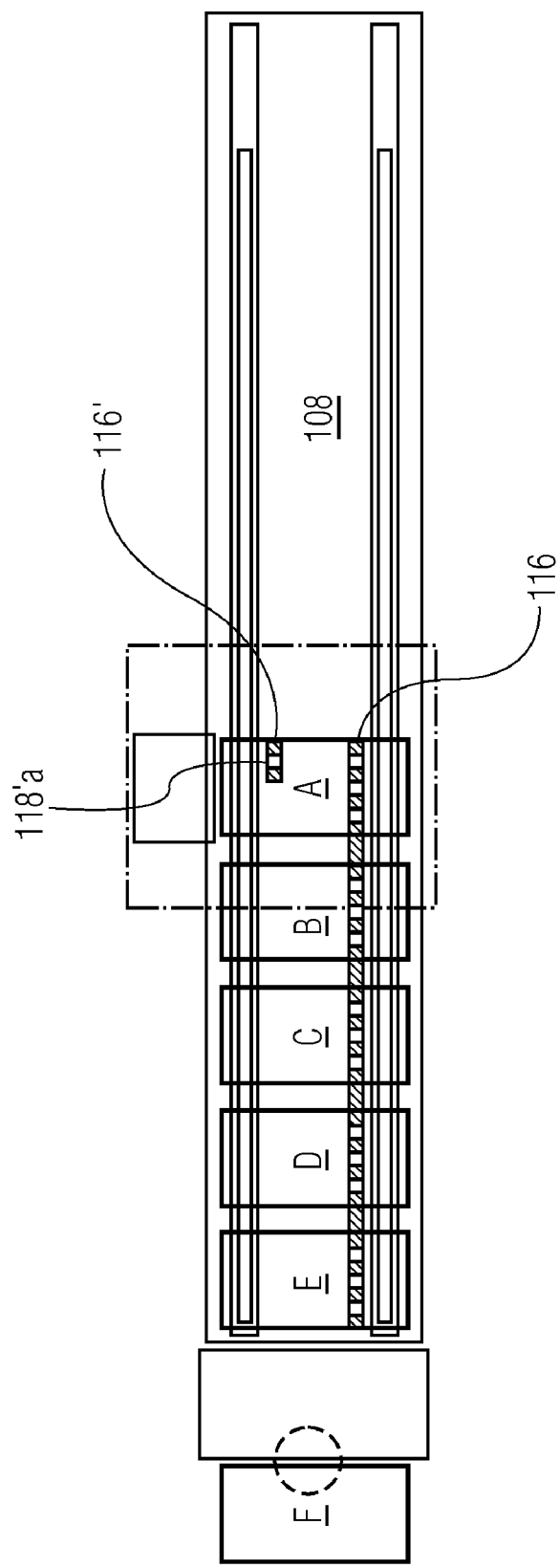
Figure 21:
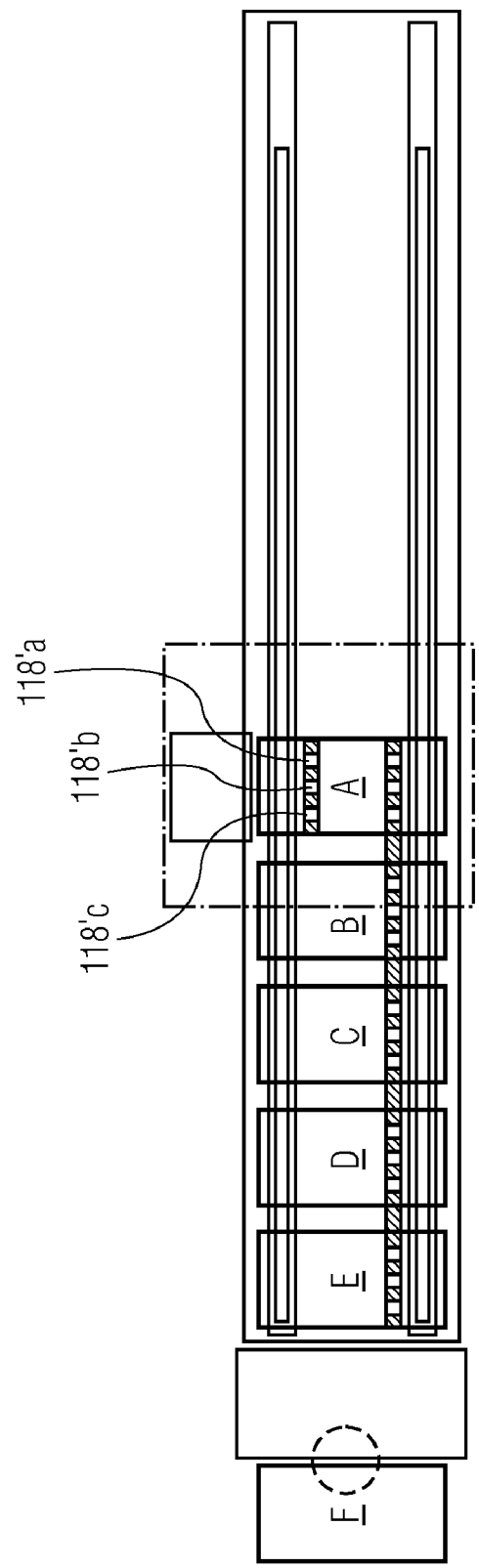
Figure 2J:
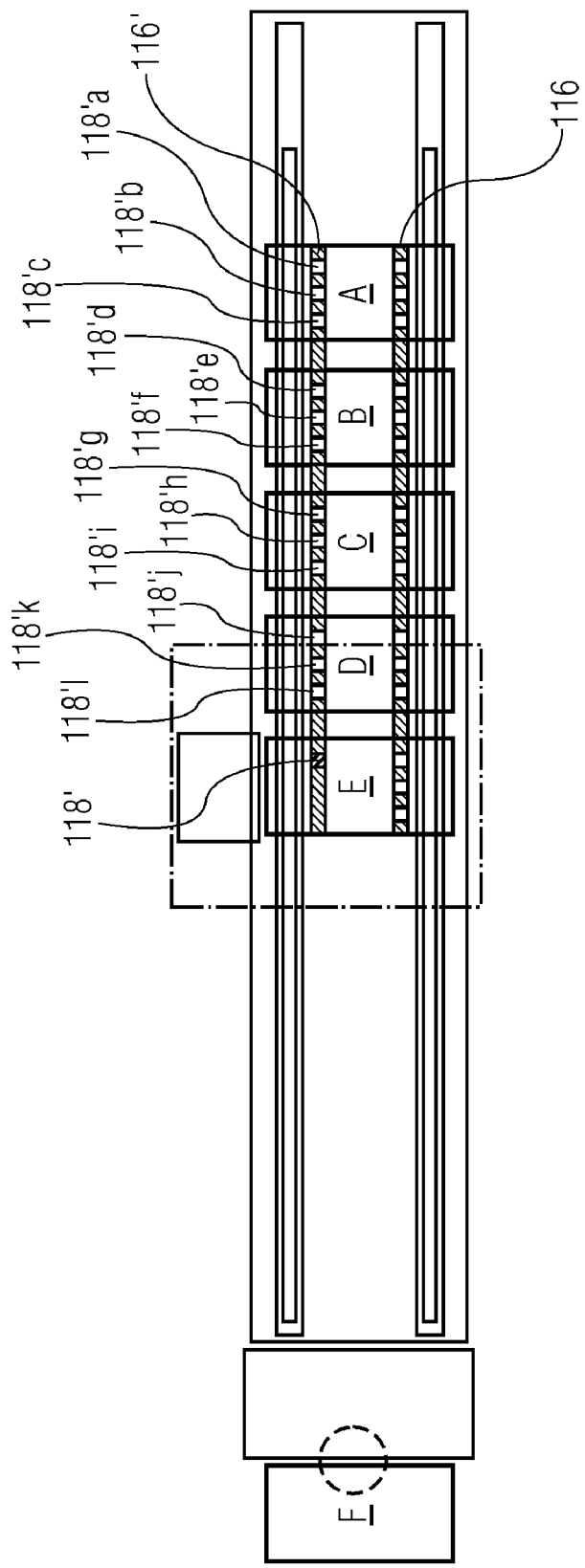
Figure 2L:
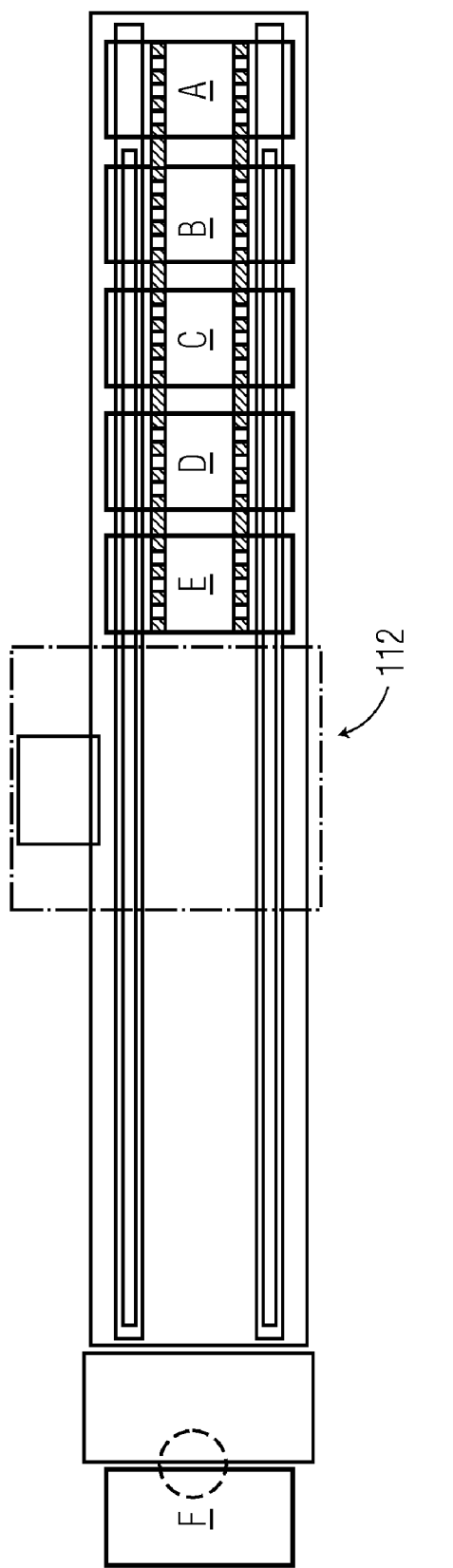

In this example, it is now desired to bond another 'upper' continuous length of ribbon material 116' across solar substrates "A"-"E", for example, spaced apart from, and in a substantially parallel orientation to, bonded ribbon material 116, as will now be described in connection with FIGS. 2H-2L. Thus, indexing system 108 is used to move solar substrates "A" through "E" such that solar substrate "A" is back in the bonding position on ribbon bonder 112. In FIG. 2H another bonded portion 118'a has been formed on second continuous length of ribbon material 116' on solar substrate "A". At FIG. 2I, three bonded portions 118'a, 118'b, 118'c have been completed on solar substrate "A". The process of indexing (and bonding) now continues such that at FIG. 2J three bonded portions 118'a-118'c; 118'd-118'f; 118'g-118'i; 118'j-118'l have been formed on each of respective solar substrates "A"-"D", and portion 118' is being bonded on solar substrate "E". At FIG. 2K, three bonded portions 118'm, 118'n, 118'o have been formed between second length of ribbon material 116' and solar substrate "E". Second continuous length of ribbon material 116' is then separated from the ribbon supply (e.g., using a cutter, etc.), and string of bonded solar substrates "A"-"E" is indexed to the right in FIG. 2L, clear of the bonding position on ribbon bonder 112, to await further processing. Thus, in FIGS. 2A-2L, an exemplary system and method is shown that is configured to bond multiple continuous lengths of ribbon material to a string of adjacent solar substrates using a single ribbon bonder.

FIGS. 3A-3D illustrate an exemplary system configured to bond multiple continuous lengths of ribbon material 316, 316' to a string of solar substrates "A"-"E" using two ribbon bonders 312, 312', wherein ribbon bonders 312, 312' are provided on opposite sides of indexing system 308. The other components of ultrasonic solar substrate bonding system 300 in FIGS. 3A-3D may be substantially similar to those illustrated and described with respect to FIGS. 2A-2L and using a different number of solar substrates but still identified as solar substrates "A", "B", "C", etc.

Figure 3A:
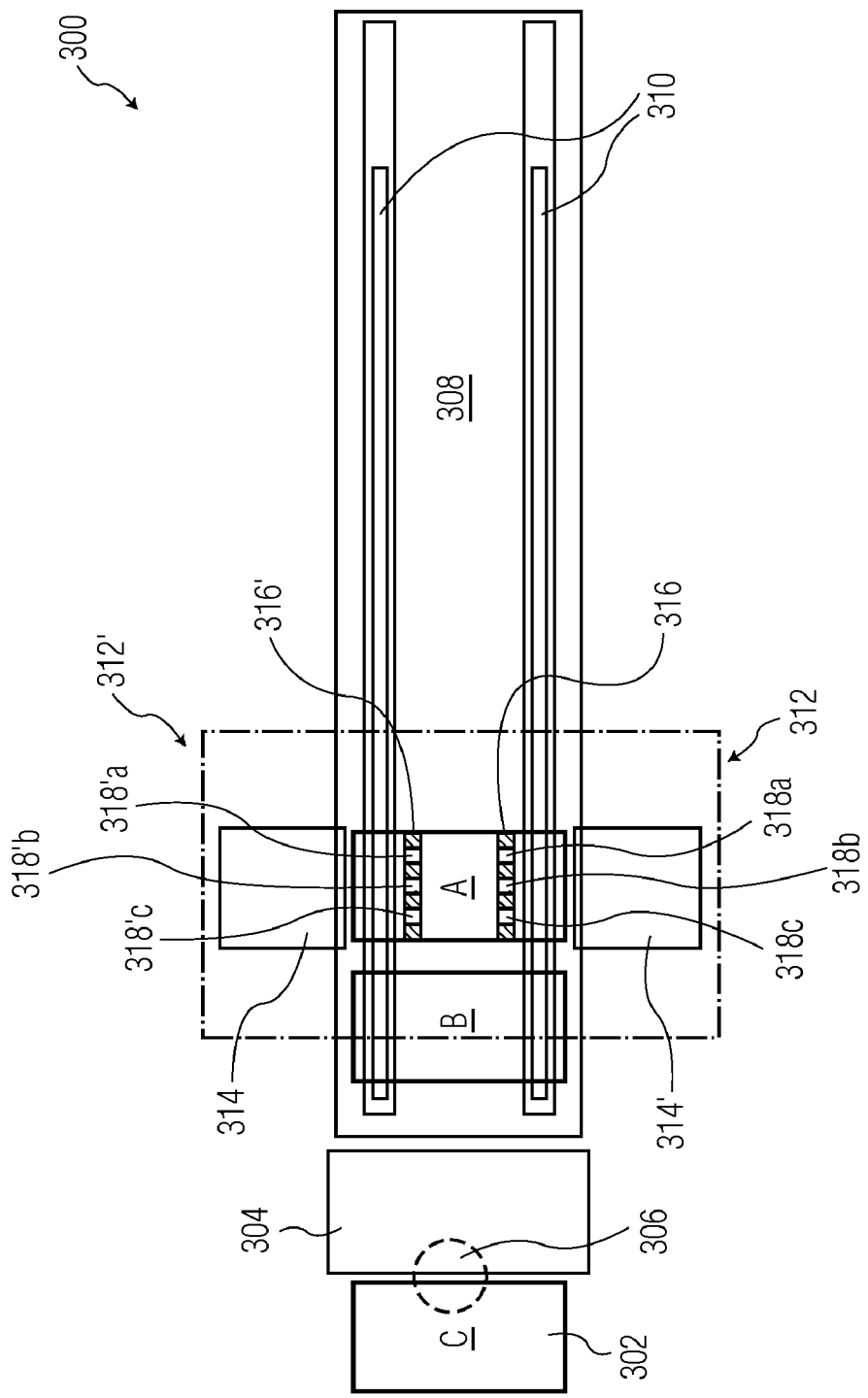
Figure 3D:
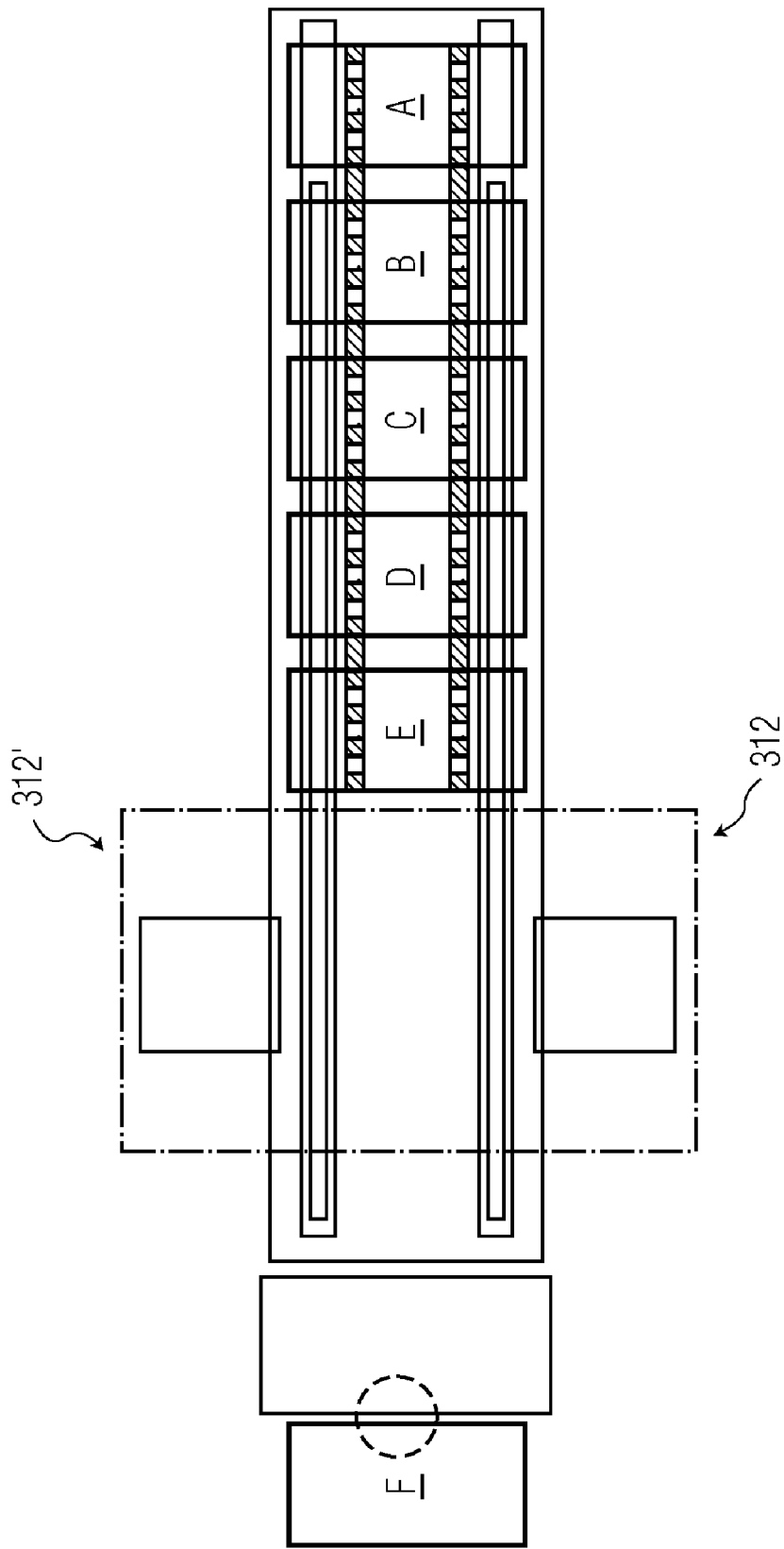

At FIG. 3A, solar substrate "A" is in the bonding position for both of ribbon bonders 312, 312', with solar substrate "B" downstream of ribbon bonders 312, 312' (where ribbon bonders 312, 312' are represented by a single dashed box), and solar substrate "C" on input stack 302. First ribbon bonder 312' has formed three bonded portions 318'a, 318'b, 318'c (on upper continuous length of ribbon material 316') on solar substrate "A", and second ribbon bonder 312 has formed three bonded portions 318a, 318b, 318c (on lower continuous length of ribbon material 316) on solar substrate "A". The process of indexing and bonding continues such that at FIG. 3B, first ribbon bonder 312' has formed three bonded portions 318'd, 318'e, 318'f (on upper continuous length of ribbon material 316') on solar substrate "B", and second ribbon bonder 312 has formed three bonded portions 318d, 318e, 318f (on lower continuous length of ribbon material 316) on solar substrate "B". The process of indexing and bonding continues on such that at FIG. 3C, the two continuous lengths of ribbon material 316, 316' have been bonded across each of solar substrates "A"-"E", and, each of upper and lower continuous lengths of ribbon material 316', 316 have been separated from their respective ribbon supplies (e.g., using a cutter, etc.). At FIG. 3D, the string of bonded solar substrates "A"-"E" has been indexed to the right, clear of the bonding position on ribbon bonders 312, 312', to await further processing.

Figure 4B:
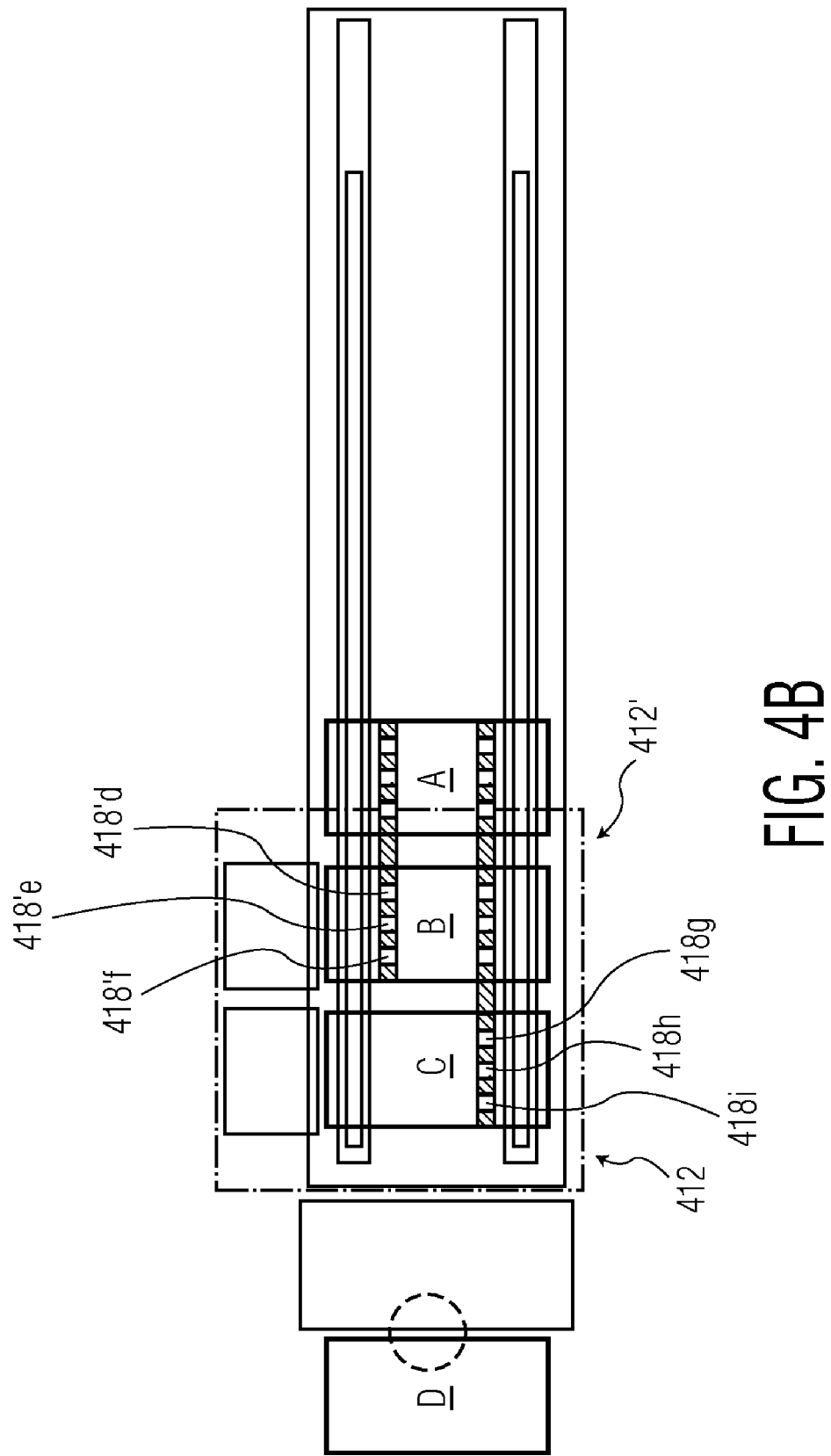
Figure 4C:
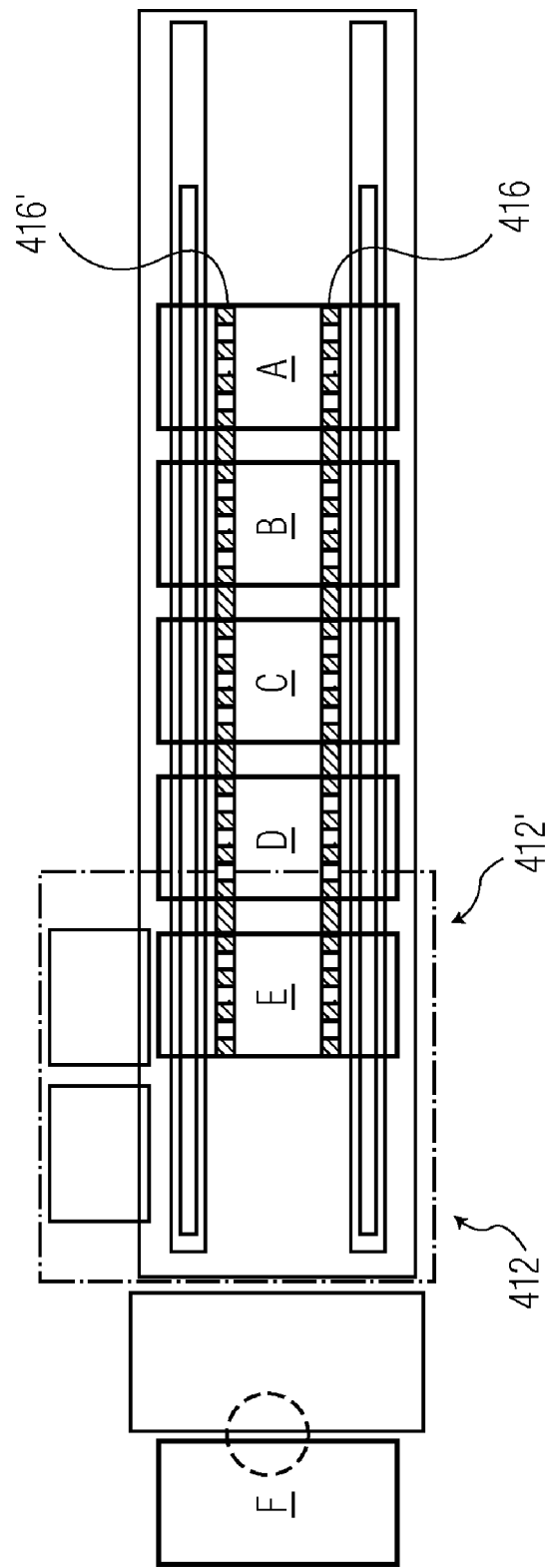

FIGS. 4A-4D illustrate an exemplary process similar to that in FIGS. 3A-3D except that first ribbon bonder 412 and second ribbon bonder 412' are positioned adjacent one another on one side of indexing system 408 (and not opposing one another as in FIGS. 3A-3D) (where ribbon bonders 412, 412' are represented by a single dashed box). The other components of the system in FIGS. 4A-4D may be substantially similar to those illustrated and described with respect to FIGS. 2A-2L and FIGS. 3A-3D. In a bonding operation before FIG. 4A (not shown), first ribbon bonder 412 (including XY table 414) has formed three bonded portions 418a, 418b, 418c between lower continuous length of ribbon material 416 and solar substrate "A". Then solar substrate "A" has been indexed to a position to be bonded by second bonder 412' (as shown in FIG. 4A), and solar substrate "B" has been indexed to a position to be bonded by first bonder 412 (as shown in FIG. 4A). In FIG. 4A, second ribbon bonder 412' has formed three bonded portions 418'a, 418'b, 418'c between upper continuous length of ribbon material 416' and solar substrate "A", and first ribbon bonder 412 has formed three bonded portions 418d, 418e, 418f between lower continuous length of ribbon material 416 and solar substrate "B", with solar substrate "C" on the top of input stack 402 to the left of camera 406 of alignment unit 404.

The process of indexing and bonding continues such that at FIG. 4B, second ribbon bonder 412' has formed three bonded portions 418'd, 418'e, 418'f between upper continuous length of ribbon material 416' and solar substrate "B", and first ribbon bonder 412 has formed three bonded portions 418g, 418h, 418i between lower continuous length of ribbon material 416 and solar substrate "C". This process of indexing and bonding continues such that at FIG. 4C, two continuous lengths of ribbon material 416, 416' have been bonded across each of solar substrates "A"-"E", where each of continuous lengths of ribbon material 416, 416' has been separated from its respective ribbon supply (e.g., using a cutter, etc.). As will be appreciated by one skilled in the art, lower continuous length of ribbon material 416 may be (if desired) separated from its ribbon supply prior to solar substrate "E" being indexed to the bonding position of second ribbon bonder 412'. At FIG. 4D, string of bonded solar substrates "A"-"E" has been indexed to the right, clear of the bonding position of second ribbon bonder 412', to await further processing.

Each of the exemplary embodiments of FIGS. 2A-2L, FIGS. 3A-3D, and FIGS. 4A-4D illustrate bonding continuous lengths of ribbon material between adjacent solar substrates. FIGS. 5A-5D illustrate bonding multiple, respective, separate lengths of ribbon material between adjacent solar substrates. The other components of the system in FIGS. 5A-5D may be substantially similar to those illustrated and described with respect to, for example, FIGS. 2A-2L (including corresponding elements input stack 502, camera 506, alignment unit 504, XY table 514, etc.). At FIG. 5A, single lower separate length of ribbon material 520a is bonded between solar substrate "A" and solar substrate "B" with separate length of ribbon material 520a having been separated from the ribbon supply (not shown). The process of indexing and bonding continues such that at FIG. 5B additional individual lower separate lengths of ribbon material 520b, 520c, 520d have been bonded between respective adjacent ones of solar substrates "B"-"C", solar substrates "C"-"D", and solar substrates "D"-"E".

Figure 5A:
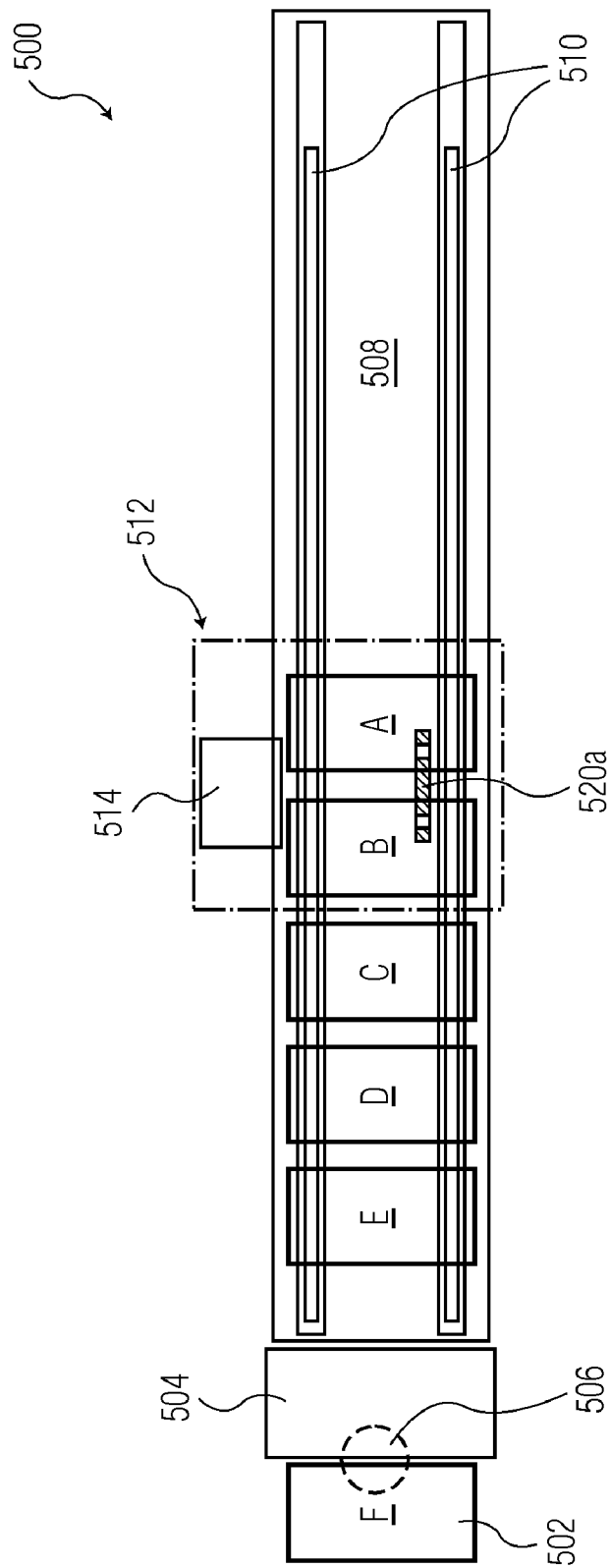
FIGS. 5A-5D are a series of plan overhead block diagram views of yet another ultrasonic solar substrate bonding system illustrating a sequential ribbon bonding operation in accordance with yet another exemplary embodiment of the present invention.
Figure 5B:
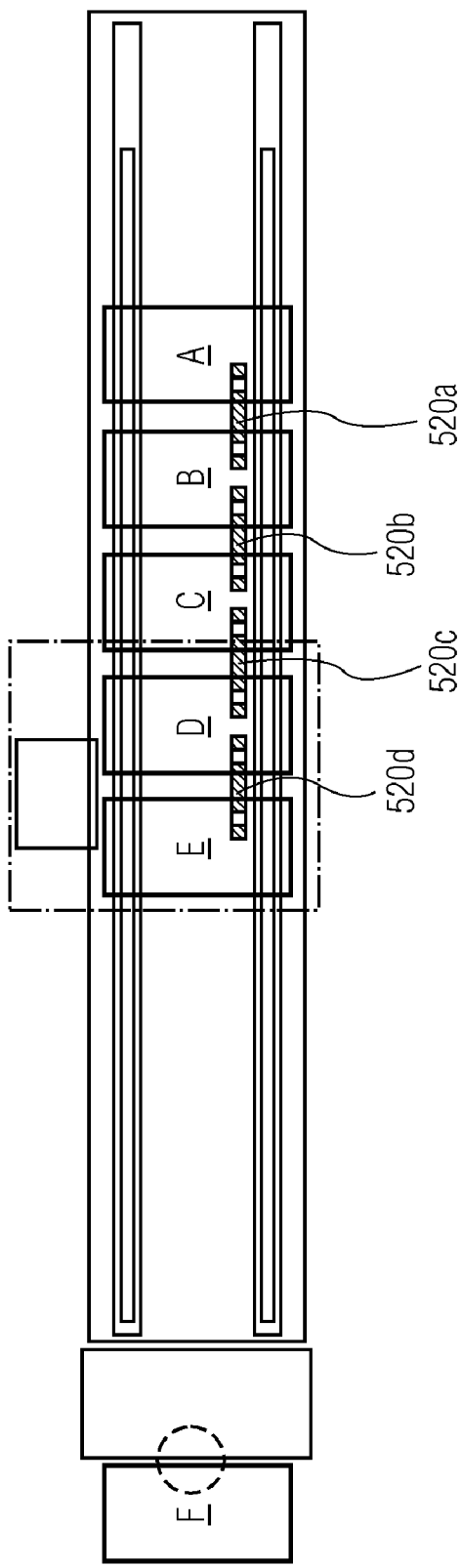
Figure 5C:
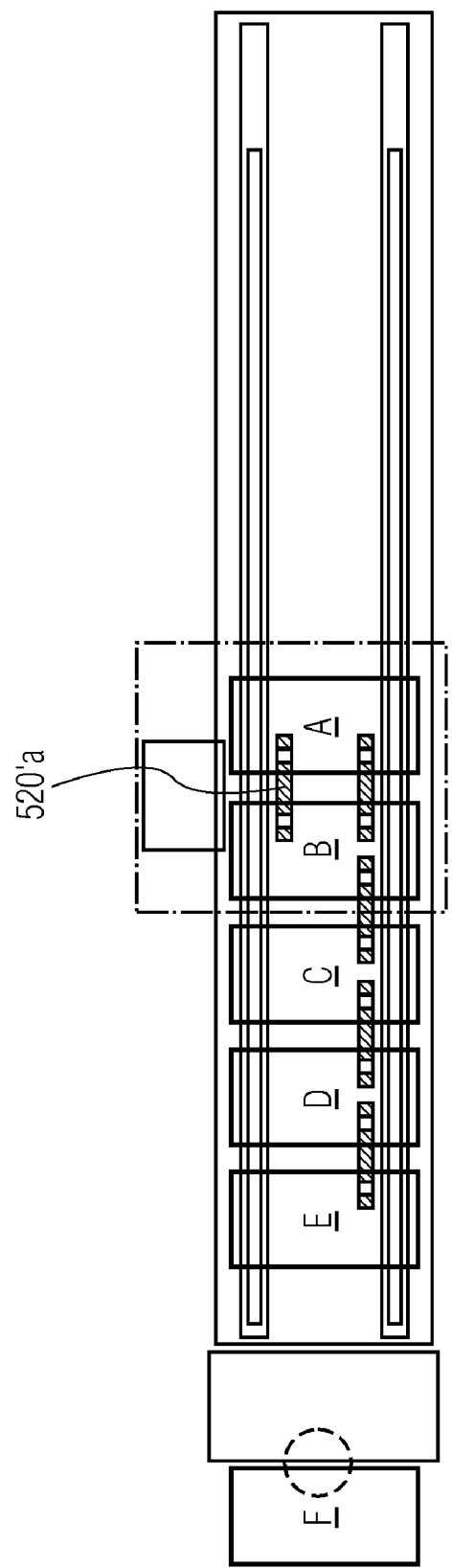
Figure 5D:
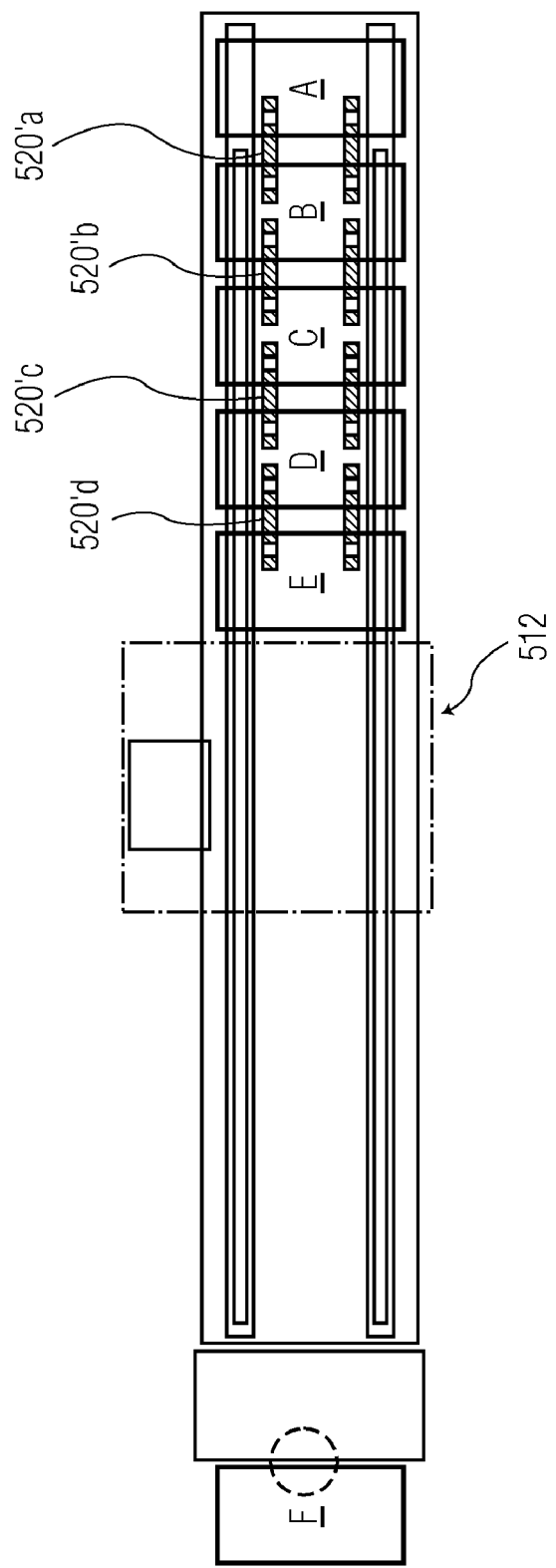

At FIG. 5C, a single upper separate length of ribbon material 520'a, is bonded between solar substrate "A" and solar substrate "B", with upper separate length of ribbon 520'a having been separated from the ribbon supply (not shown). The process of indexing and bonding continues such that at FIG. 5D additional individual upper separate lengths of ribbon material 520'b, 520'c, 520'd have been bonded between respective adjacent ones of solar substrates "B"-"C", "C"-"D", and "D"-"E", and with the bonded string of solar substrates "A"-"E" having been further indexed to the right, clear of the bonding position on ribbon bonder 512, and awaiting further processing.

In each of FIGS. 2A-2L, FIGS. 3A-3D, FIGS. 4A-4D, and FIGS. 5A-5D two lengths of ribbon material (continuous lengths in FIGS. 2A-2L, FIGS. 3A-3D, and FIGS. 4A-4D, and non-continuous or separate, lengths (from one or more continuous supplies of ribbon material) in FIGS. 5A-5D) are provided between each of the adjacent solar substrates. Of course, any number of lengths (e.g., one length, three lengths, etc.) of ribbon material (and any number of ribbon bonders, if it is desired to have one bonder for each length of ribbon as in FIGS. 3A-3D and FIGS. 4A-4D) may be provided as is desired in a given application.

Figure 6A:
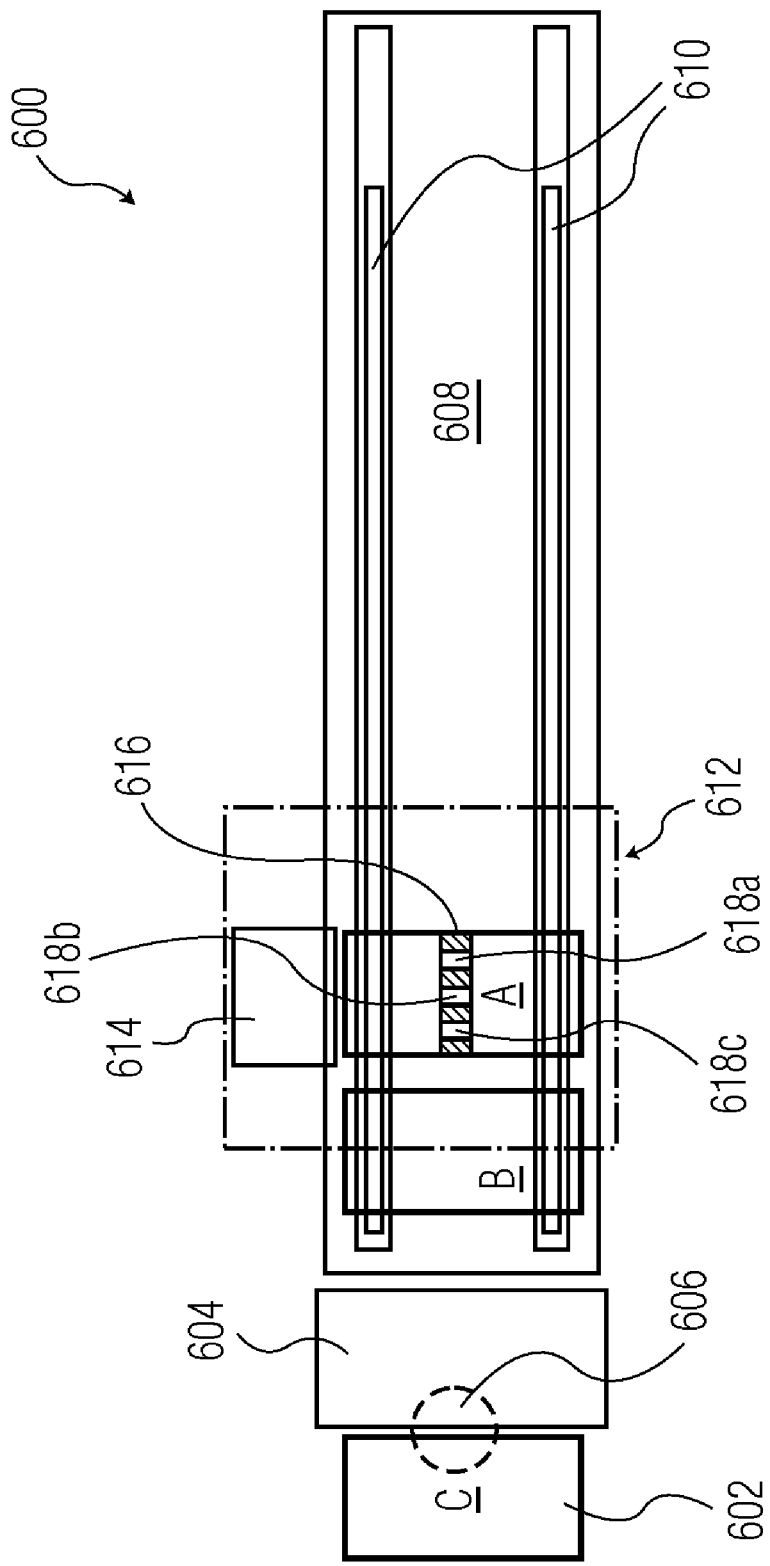
Figure 6C:
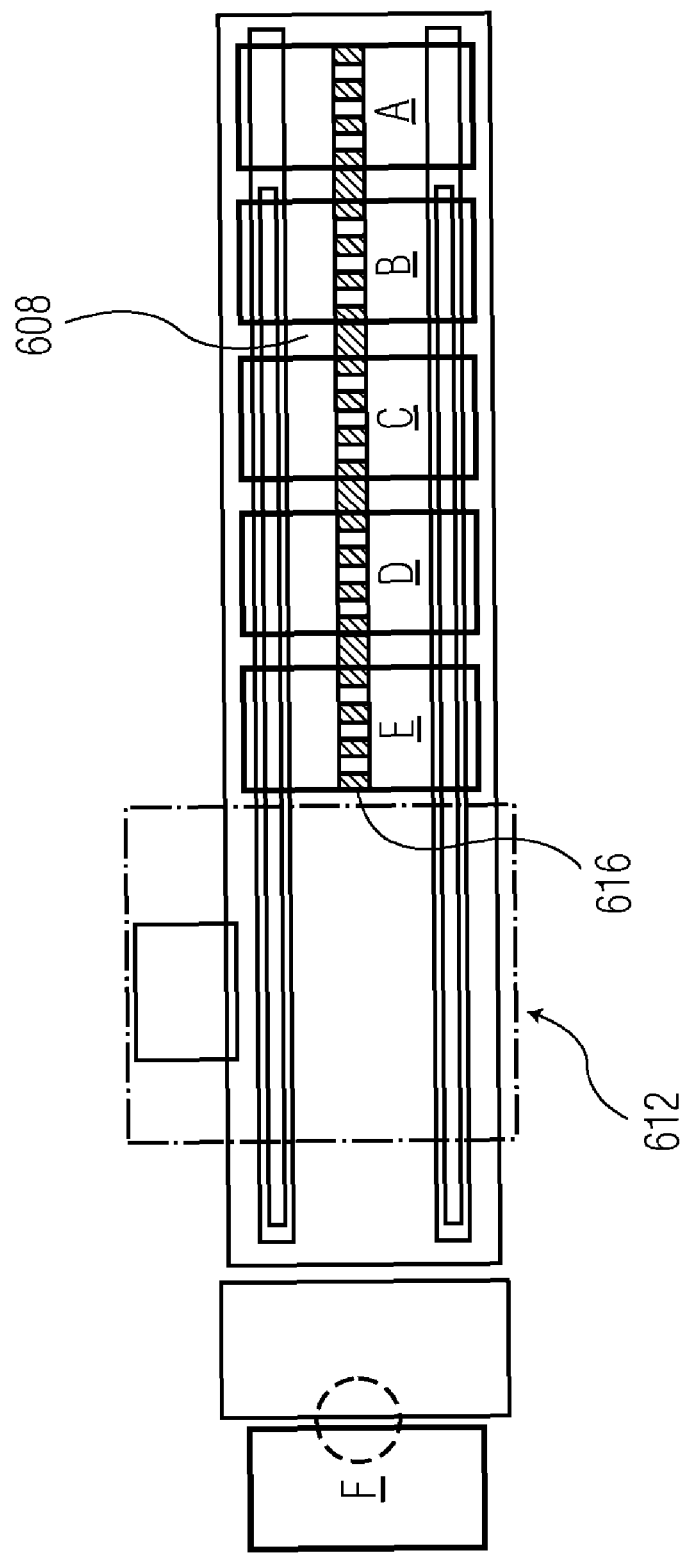

FIGS. 6A-6C illustrate single continuous length of ribbon material 616 being bonded between solar substrates "A"-"E" using ultrasonic solar substrate bonding system 600. The components of the system in FIGS. 6A-6C (and the process of indexing and bonding) may be substantially similar to those illustrated and described above with respect to, for example, FIGS. 2A-2L (including corresponding elements input stack 602, camera 606, alignment unit 604, XY table 614, etc.). For example, substrate "A" is aligned with, and positioned at, the bonding position for ribbon bonder 612 and ribbon material 616 is bonded to substrate "A" substantially along the midpoint of substrate "A" between its upper and lower horizontal edges by bonds 618a, 618b, 618c. String of solar cells "A"-"E", for example, are indexed such that substrate "B" is positioned at the bonding position for ribbon bonder 612 and three bonds 618d, 618e, 618f are formed between continuous ribbon material 616 and substrate "B". Substrates "C"-"E" are also, in turn, so bonded such that continuous length of ribbon material 616 is bonded to each. As illustrated in FIG. 6C, continuous length of ribbon material 616 was severed from its ribbon supply, and bonded substrates "A"-"E" were indexed by index system 608 to be clear from ribbon bonder 612. It is also contemplated that continuous ribbon material 616 may be bonded at different positions on substrates "A"-"E", for example nearer one upper or lower edge of substrates "A"-"E", and that the ribbon may be bonded at a different position on one or more adjacent solar substrates "A"-"E".

Figure 7:
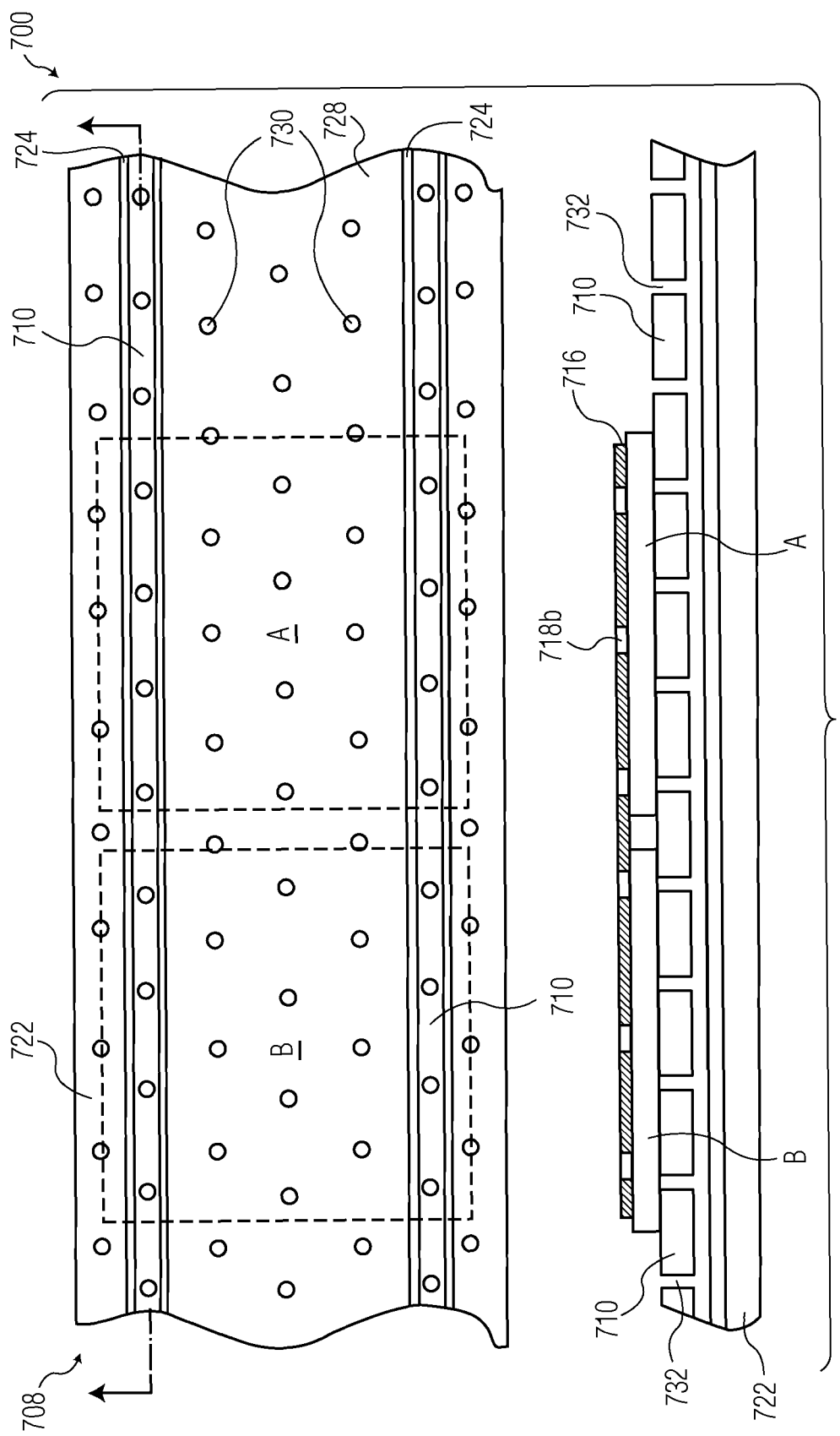
FIG. 7 is an overhead and cross sectional block diagram view of portions of a material handling system in accordance with an exemplary embodiment of the present invention.

FIG. 7 partially illustrates workholder 722 of indexing system 708 of ribbon bonding system 700 (in a top plan view, and a corresponding cross sectional view taken along the cross section shown in the top plan view), with the top view showing substrates "A" and "B" in dashed lines and without the bonded continuous lengths of ribbon material 716 (such as bonded portion 718b), for ease of understanding. That is, at the bonding position of indexing system 708 (and desirably at other locations along indexing system 708), it is desirable to secure string of solar substrates "A" and "B" in place during bonding. It is understood that there may be additional solar substrates to the left of substrate "B" (relative to FIG. 7). Workholder 722 defines apertures 724 along its length such that during indexing of string of solar substrates "A"-"B" walking beam members 710 may raise upwards (through apertures 724) and carry string of solar substrates "A"-"B" as desired. Workholder surface 728 (and walking beam members 710, if desired) may further define respective vacuum holes 730, 732 such that a negative fluid pressure may be drawn through one or more vacuum holes 730, 732 to secure solar substrates (for example substrates "A"-"B") in position. Such vacuum holes 730, 732 may be provided along the entire length of indexing system 708, or along any portion of indexing system 708, as is desired in a given application.

FIGS. 8A-8F are each side and corresponding top block diagram views of various elements of exemplary ultrasonic ribbon bonding system 800. The teachings of FIGS. 8A-8F may be applied to various exemplary embodiments of the present invention, including those described above, as well as others. At FIG. 8A, first (upper) continuous length of ribbon material 816' has already been bonded across adjacent solar substrates "A"-"B", and second (lower) continuous length of ribbon material 816 is still in the process of being bonded across solar substrates "A"-"B". That is, in FIG. 8A, third bond 818f is being formed between second (lower) continuous length of ribbon material 816 and solar substrate "B" using bonding tool 834.

Continuous ribbon material 816 is shown being fed through ribbon guide 836 adjacent bonding tool 834, such that ribbon guide 836 may be configured to guide the portions of the continuous length of ribbon material 816 from a ribbon supply to a position proximate bonding tool 834 of bond head assembly "BHA". Ribbon guide 836 may be configured to travel along a substantially vertical axis in relation to the XY table, independent of bond head assembly "BHA". Ribbon guide 836 may also include terminal portion 836' proximate bonding tool 834 to limit placement of the portions of the continuous length of the ribbon material proximate bonding tool 834 within a predetermined range in a Y direction (that is, substantially perpendicular to the direction in which continuous length of ribbon material follows. Ribbon guide 836 may include a roller mechanism (not shown) to guide and feed continuous ribbon material 816 from a spool of the ribbon material. Further, a tensioner (not shown) may be positioned between the ribbon supply and ribbon guide 836. The tensioner may be configured to provide a predetermined amount of tension to the portions of the continuous length of ribbon material 816, 816' between the ribbon supply and the tensioner. The tensioner may also be configured to feed the portions of the continuous length of ribbon 816, 816' material from the ribbon supply through ribbon guide 836.

The detailed view of the bond head assembly "BHA" including bonding tool 834 also illustrates exemplary pressing member 838 and cutter 840 carried by bond head assembly "BHA" and proximate bonding tool 834. Pressing member 838 may be between cutter 840 and bonding tool 834, or cutter 840 may be between pressing member 838 and bonding tool 834. Pressing member 838 is moveable with respect to bond head assembly "BHA" independent of the bonding tool, and is configured to press against portions 842 of the continuous length of ribbon material 816 adjacent the formed ultrasonic bonds. When bonding tool 834 is raised above bonded ribbon material 816 (e.g., after forming ribbon bond 818f) pressing member 838 may secure bonded ribbon material 816 against the surface to which it is bonded, thereby reducing the potential that portions 842 of continuous ribbon material 816 (that may be stuck to bonding tool 834) are raised upwards with bonding tool 834 which may damage/weaken bond 818f and/or portions of adjacent solar substrate "B". Pressing member 838 is moveable (independent of movement of bonding tool 834) with respect to bond head assembly "BHA", where the bond head assembly "BHA" carries bonding tool 834 and pressing member 838. Bond head assembly "BHA" may be configured to travel along a substantially vertical axis, independent of ribbon guide 836, such that bonding tool 834 is adapted to form the ultrasonic bonds between the portions of the continuous lengths of ribbon material 816, 816' and the plurality of solar substrates "A"-"C". Further, bond head assembly "BHA" may be configured to rotate in an XY plane about a theta (θ) axis such that cutter 840 may rotate about the theta (θ) axis with bond head assembly "BHA".

Figure 8A:
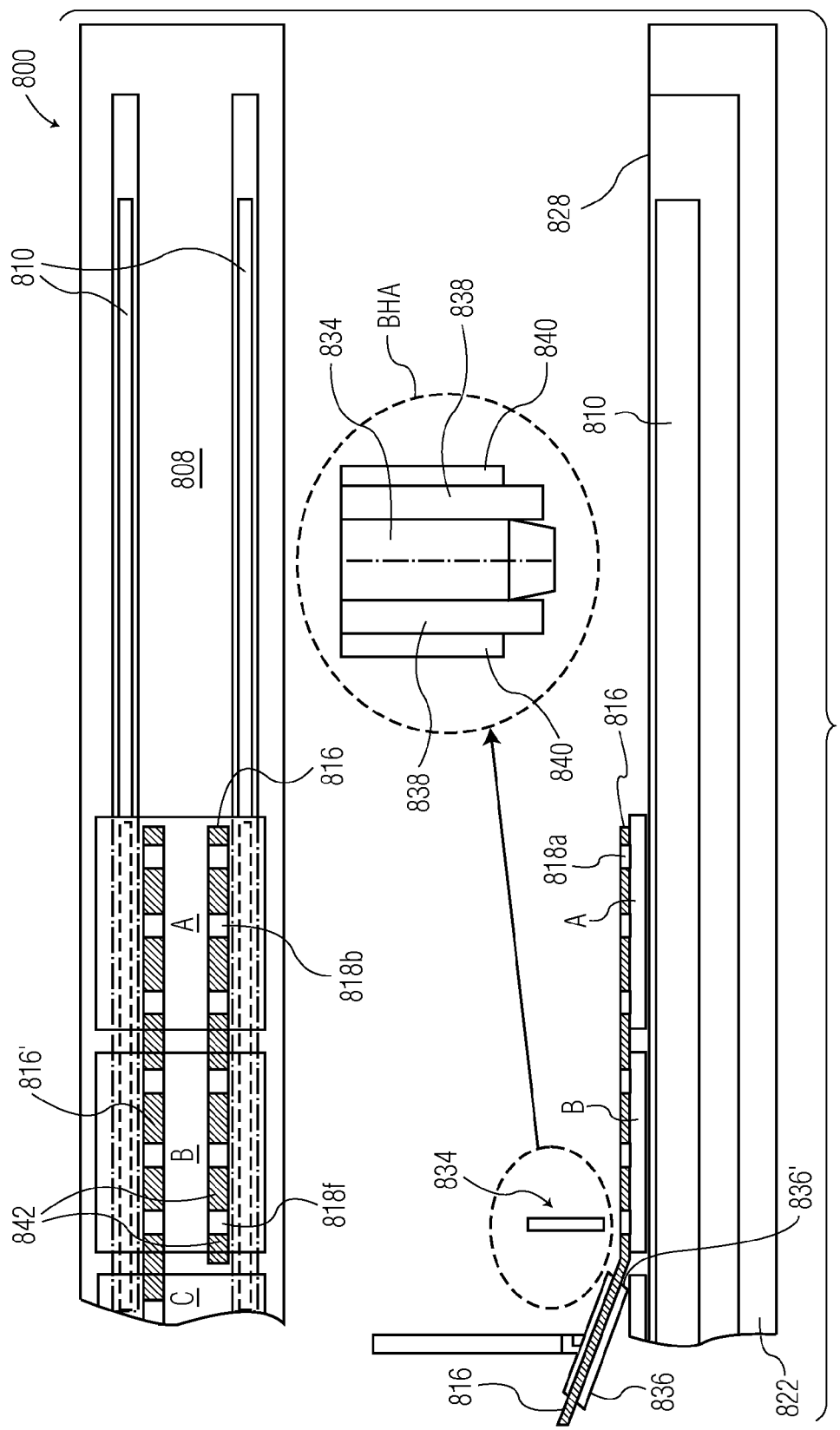
FIGS. 8A-8F are a series of overhead block diagram views, and corresponding cross-sectional side block diagram views, of a material handling system of an ultrasonic solar substrate bonding system in accordance with yet another exemplary embodiment of the present invention.
Figure 8B:
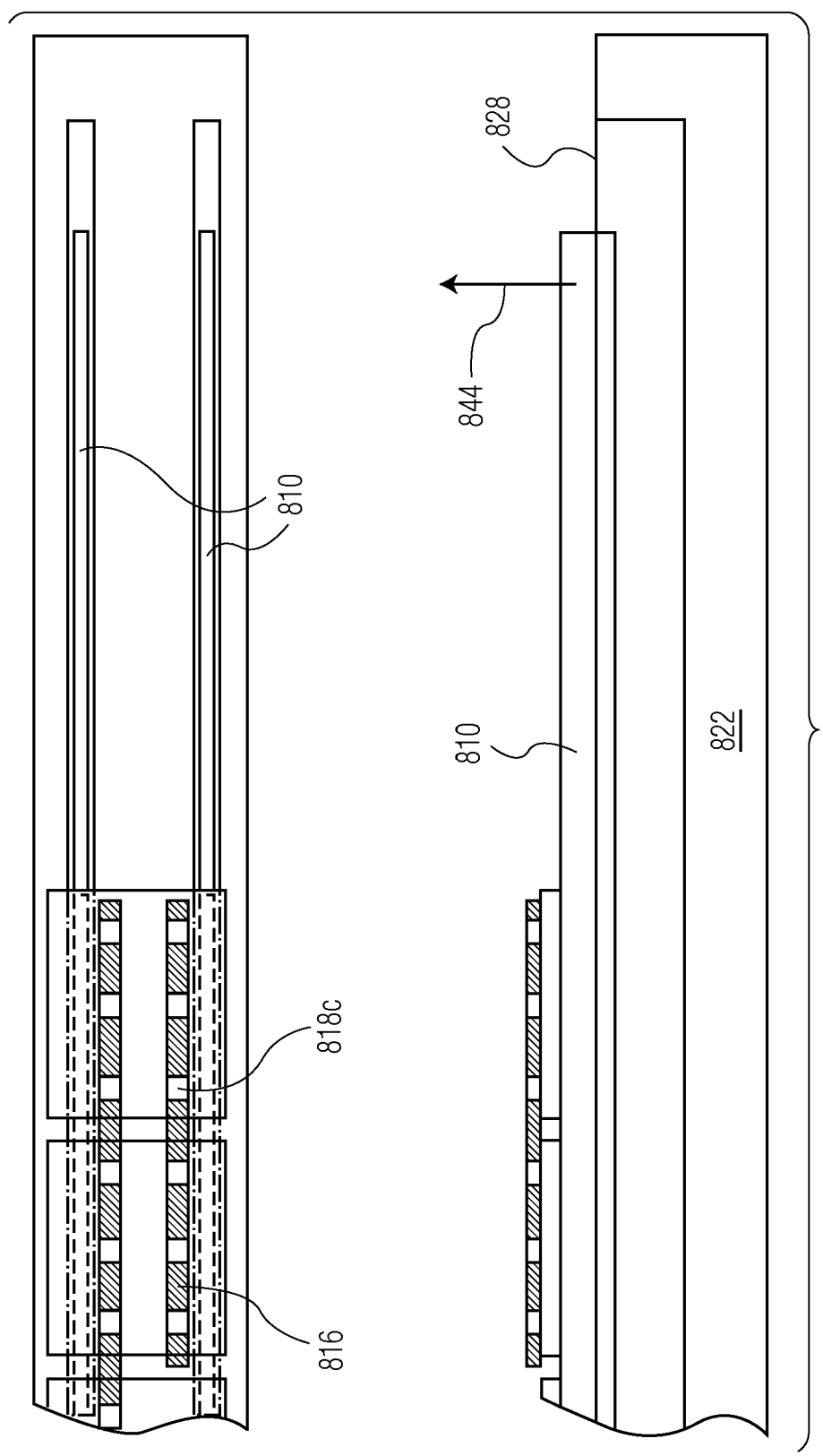

After formation of third bond 818f in second (lower) length of ribbon material 816 at FIG. 8A, the string of solar substrates "A", "B", "C" is indexed using indexer 808 to the right such that solar substrate "C" (partially shown to the left of substrate "B" in FIG. 8A) may be moved to the bonding position on the ribbon bonder. Thus, at FIG. 8B, walking beam elements 810 of indexer 808 are raised together (as at arrow 844) to contact and secure (e.g., with vacuum holes that may be defined by walking beam elements 810 such as at FIG. 7) string of solar substrates "A"-"C". As will be appreciated by those skilled in the art, in order to index string of solar substrates "A"-"C" the negative pressure drawn through the workholder through-holes may be shut off (or otherwise released) such that the string of solar substrates "A"-"C" may be desirably raised above workholder surface 828 using walking beam elements 810.

Figure 8C:
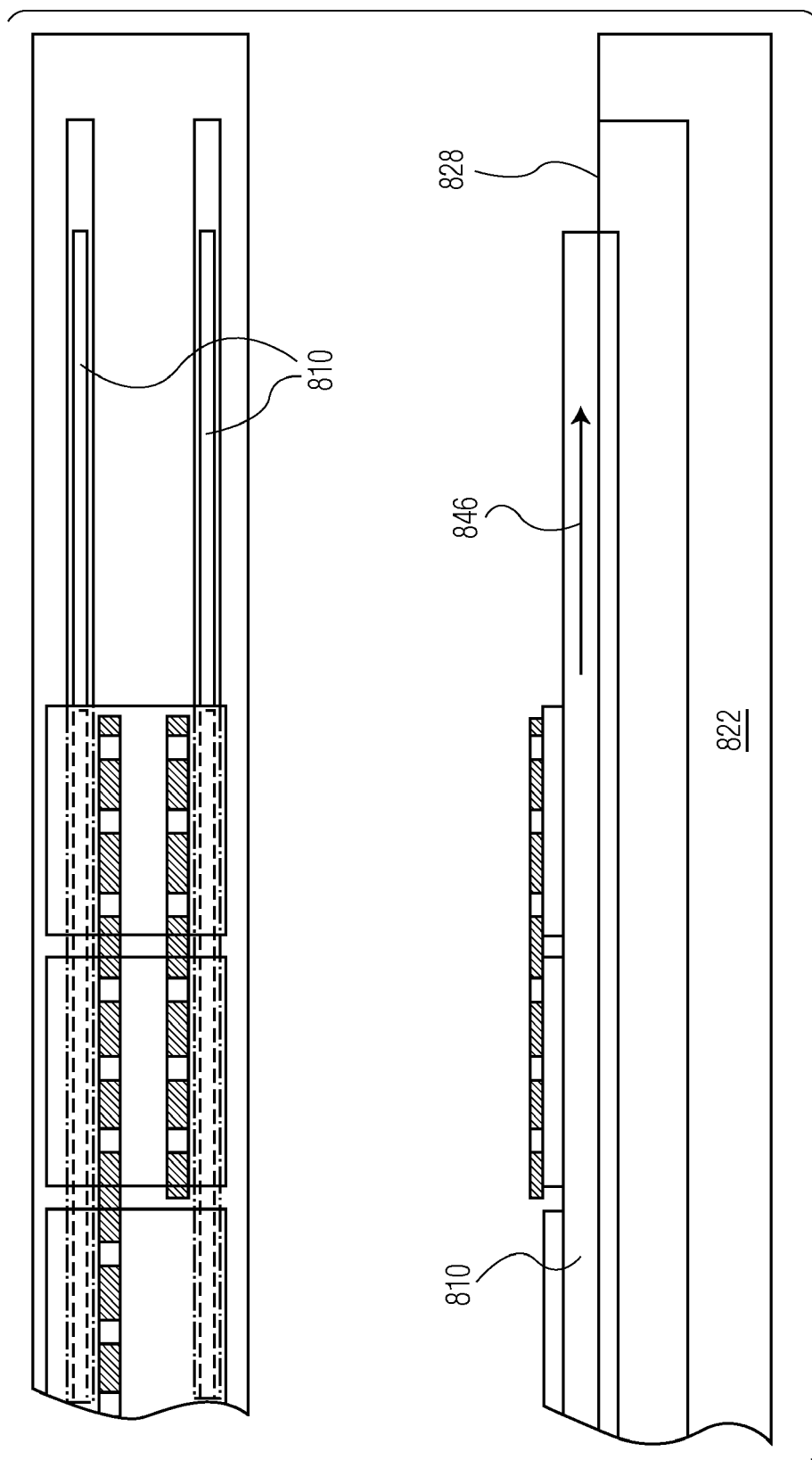
Figure 8D:
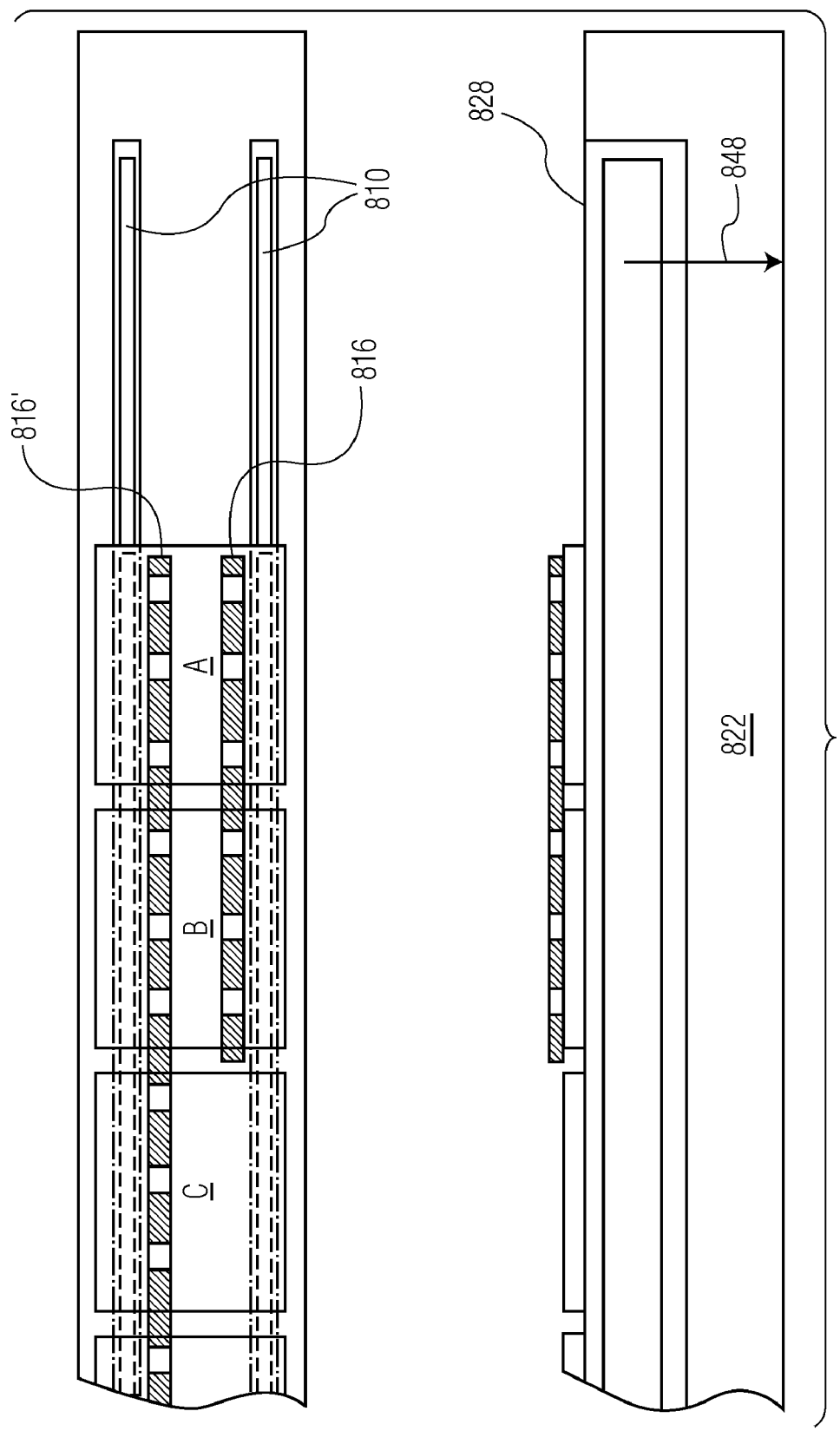
Figure 8E:
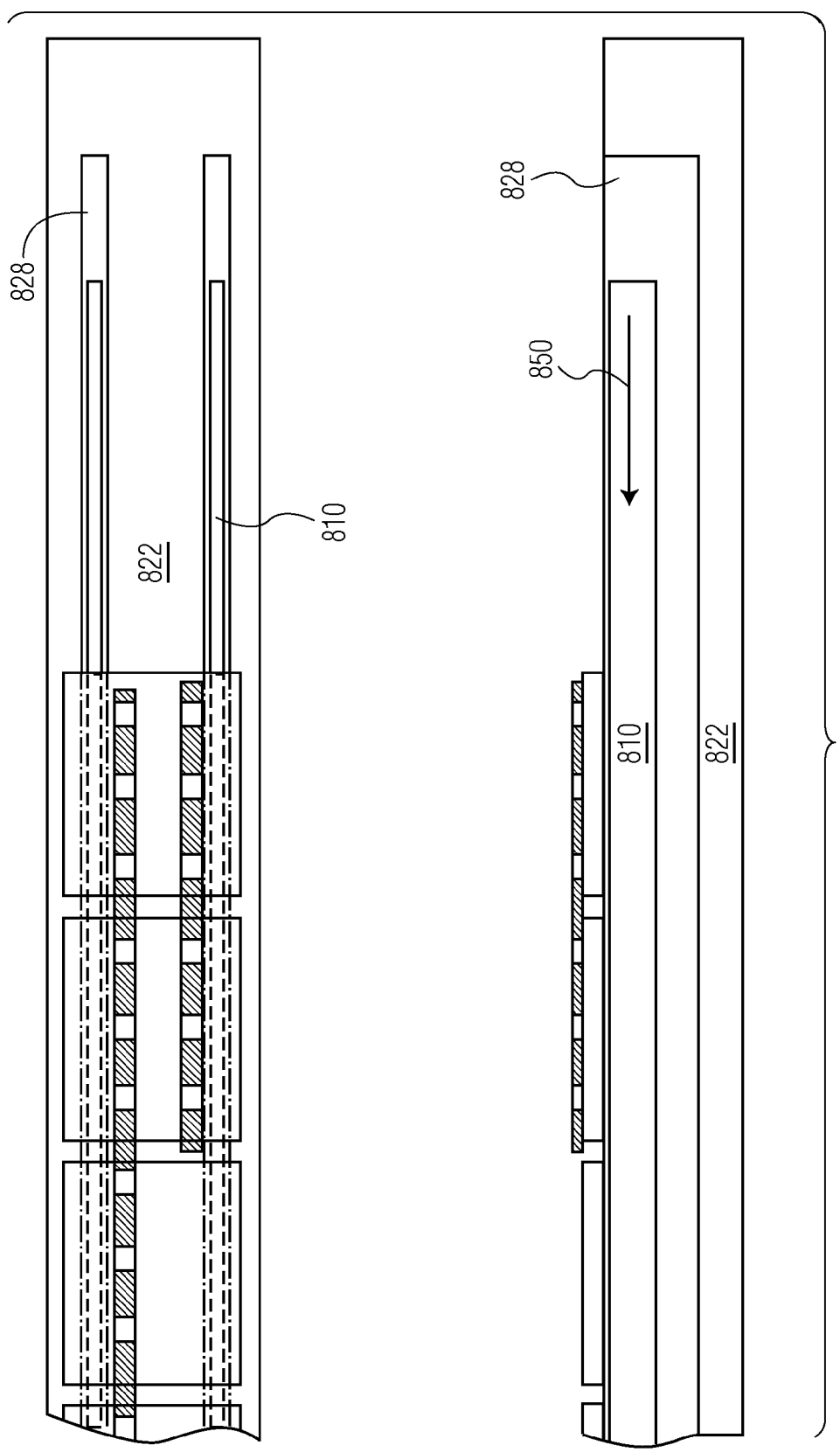
Figure 8F:
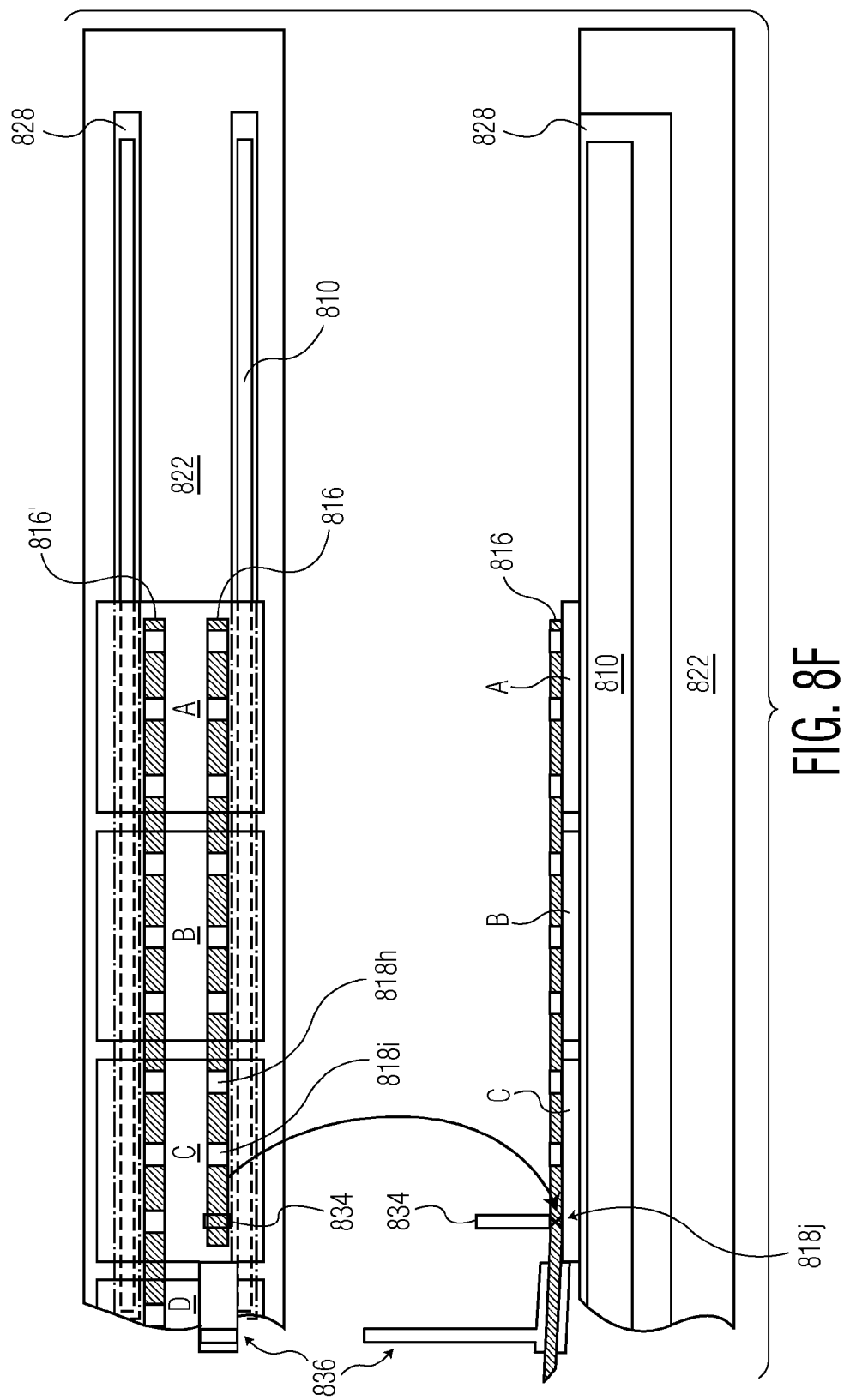

At FIG. 8C, walking beam elements 810 are moved to the right (as at arrow 846). At FIG. 8D, walking beam elements 810 are lowered (as at arrow 848) such that string of solar substrates "A"-"C" are again in contact with workholder surface 828, with solar substrate "C" now in the bonding position of ultrasonic ribbon bonding system 800 (where certain ribbon bonder elements, including bond head assembly "BHA", have been removed from parts of FIGS. 8B-8F for simplicity), such that second (lower) continuous length of ribbon material may be bonded to solar substrate "C". As will be appreciated by those skilled in the art, the negative pressure drawn through vacuum holes of walking beam elements 810 (if any) may now be shut off or otherwise released, and the negative pressure may be again drawn through workholder 822 to secure string of solar substrates "A"-"B" for bonding. FIG. 8E illustrates walking beam elements 810 moving to the left (as at arrow 850), below string of solar substrates "A"-"B" and workholder surface 828, for the next cycle of indexing. FIG. 8F illustrates the state of string of substrates "A"-"C" ("D") after two bonds 818h, 818i have been formed between lower continuous length of ribbon 816 and substrate "C". Third bond 818j of solar substrate "C" is in the process of being formed using bonding tool 834. As shown, ribbon guide 836 is guiding continuous length of ribbon 816 from a ribbon supply (e.g., a spool of continuous ribbon 815, not shown). This process may repeat as described above until the desired lengths of continuous conductive ribbon material 816 provides interconnection between the desired string of solar substrates, for example "A"-"D" (with a portion of substrate "D" shown to the left of substrate "C" and already having been bonded to upper continuous length of ribbon material 816').

It is understood by those skilled in the art that during an ultrasonic bonding process, a transducer is used to vibrate an ultrasonic tool so that a scrubbing motion (usually in one direction) is used to bond, for example, a continuous length of ribbon material to a frontside and/or backside of a substrate. During such an ultrasonic bonding process, the scrubbing motion may be: (1) substantially perpendicular to the direction along which the continuous length of ribbon material extends; (2) substantially parallel to the direction along which the continuous length of ribbon material extends, amongst other directions.

While the present invention is largely intended to be useful in ultrasonically bonding portions of a continuous ribbon material to respective backsides of solar substrates (where the backside includes a conductive region), the present invention may also be useful in bonding ribbon material to the frontside of solar substrates (where the frontside includes active solar material configured for receiving light energy and converting the light energy into electrical energy).

Although the present invention has been described primarily in terms of solar cell bonding applications (e.g., crystalline silicon solar cells, thin film solar cells, etc.), it is not limited thereto. The teachings of the present invention have application in any of a number of ultrasonic bonding applications (e.g., wire bonding).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of providing electrical interconnection between solar substrates, the method comprising the steps of:
   (a) providing an XY table configured to carry a bond head assembly and a ribbon feeding system, the bond head assembly including a bonding tool, the ribbon feeding system being configured to feed a ribbon material to a position proximate the bonding tool through a ribbon guide of the ribbon feeding system, wherein the bond head assembly is configured to be moved along a substantially vertical axis, independent of the ribbon guide, such that the bonding tool of the bond head assembly is configured to form ultrasonic bonds;
   (b) ultrasonically bonding a portion of the ribbon material to a bonding location of a first solar substrate with the bonding tool to form a first bonded portion;
   (c) extending a length of the ribbon material continuous with the first bonded portion to a second solar substrate; and
   (d) ultrasonically bonding another portion of the ribbon material, continuous with the length of the ribbon material, to a bonding location of the second solar substrate with the bonding tool to form a second bonded portion.

2. The method of claim 1 further comprising the step of (e) cutting the ribbon material at a position proximate the another portion using a cutter after step (d), thereby separating the another portion from a supply of the ribbon material.

3. The method of claim 2 wherein the cutter is carried by the bond head assembly, the bond head assembly being configured to rotate in an XY plane about a theta (θ) axis such that the cutter rotates about the theta (θ) axis with the bond head assembly.

4. The method of claim 1 further comprising the step of (e) extending another length of the ribbon material continuous with the second bonded portion to a subsequent solar substrate after step (d).

5. The method of claim 1 wherein the bonding tool bonds at least one of the portion or the another portion through ultrasonic motion in a direction substantially perpendicular to a direction along which the length of the ribbon material extends.

6. The method of claim 1 wherein the bonding tool bonds at least one of the portion or the another portion through ultrasonic motion in a direction substantially parallel to a direction along which the length of the ribbon material extends.

7. The method of claim 1 wherein each of the first solar substrate and the second solar substrate includes a frontside having exposed active solar material configured for receiving light energy and converting the light energy into electrical energy, and a backside at least partially defined by an electrical conductive region, and wherein each of steps (b) and (d) includes ultrasonically bonding the portion, and the another portion, of the ribbon material to respective backsides of the first solar substrate and the second solar substrate.

8. The method of claim 1 further comprising the step of positioning the first solar substrate in a predetermined position using an alignment unit prior to step (b).

9. The method of claim 1 further comprising the step of imaging the first solar substrate prior to step (b) using a camera.

10. The method of claim 9 further comprising a step of positioning the first solar substrate in a predetermined position using images provided by the camera.

11. The method of claim 1 further comprising the step of providing a terminal portion of the ribbon guide proximate the bonding tool during bonding of portions of the ribbon material, whereby the terminal portion limits placement of the ribbon material proximate the bonding tool within a predetermined range in a Y direction.

12. The method of claim 1 wherein the ribbon guide comprises a roller mechanism configured to guide and feed the ribbon material to the position proximate the bonding tool.

13. The method of claim 1 wherein the ribbon feeding system feeds the ribbon material from a ribbon supply.

14. The method of claim 13 wherein the ribbon supply is a spool of the ribbon material.

15. The method of claim 13 further comprising the step of applying a predetermined amount of tension to the ribbon material using a tensioner positioned between the ribbon supply and the ribbon guide.

16. The method of claim 15 further comprising the step of feeding portions of the ribbon material from the ribbon supply using the tensioner.

17. The method of claim 1 further comprising the step of moving the ribbon guide, independent of the bond head assembly, along a substantially vertical axis in relation to the XY table.

18. The method of claim 1 further comprising the step of pressing against the ribbon material proximate the bonding tool using a pressing member prior to removal of the bonding tool from the ribbon material after formation of the ultrasonic bonds, the pressing member being carried by the bond head assembly.

19. The method of claim 18 wherein the pressing member is moveable with respect to the bond head assembly independent of the bonding tool.

20. The method of claim 1 further comprising the steps of:
   (e) providing a second bond head assembly including a second bonding tool, the second bond head assembly being positioned adjacent the bond head assembly in a side by side configuration;
   (f) bonding a continuous length of the ribbon material between the first solar substrate and the second solar substrate using the bonding tool through steps (b) through (d); and
   (g) bonding another continuous length of the ribbon material between the first solar substrate and the second solar substrate using the second bonding tool.

21. The method of claim 20 wherein the another continuous length of the ribbon material bonded by the second bonding tool is substantially parallel to the continuous length of the ribbon material bonded by the bonding tool.

22. The method of claim 1 further comprising the steps of:
(e) providing a second bond head assembly including a second bonding tool, the second bond head assembly being positioned on an opposing side of a material handling system substrate with respect to the bond head assembly, the material handling system supporting the first solar substrate and the second solar substrate;
(f) bonding a continuous length of the ribbon material between the first solar substrate and the second solar substrate using the bonding tool through steps (b) through (d); and
(g) bonding another continuous length of the ribbon material between the first solar substrate and the second solar substrate using the second bonding tool.

23. The method of claim 22 wherein the another continuous length of the ribbon material bonded by the second bonding tool is substantially parallel to the continuous length of the ribbon material bonded by the bonding tool.

24. The method of claim 1 further comprising the step of providing a material handling system configured to:
(i) support ones of a plurality of solar substrates including the first solar substrate and the second solar substrate upstream of the bond head assembly;
(ii) position ones of the plurality of solar substrates in a bonding position for bonding by the bond head assembly; and
(iii) support bonded ones of the plurality of solar substrates downstream of the bond head assembly.

25. The method of claim 24 wherein the material handling system includes a walking beam structure.

26. The method of claim 25 wherein the walking beam structure is configured to move ones of the plurality of solar substrates through a range of motion including a position upstream of the bonding position, at the bonding position, and a position downstream of the bonding position.

27. The method of claim 24 wherein the material handling system includes a workholder structure for supporting ones of the plurality of solar substrates at the bonding position.

28. The method of claim 24 wherein the material handling system includes a walking beam structure configured to move ones of the plurality of solar substrates through a range of motion, and a workholder structure for supporting ones of the plurality of solar substrates at the bonding position.

29. The method of claim 28 further comprising the step of drawing a negative fluid pressure through a plurality of through holes defined by at least one of the walking beam structure and the workholder structure to retain ones of the plurality of solar substrates in predetermined positions along the material handling system.

* * * * *